(12) United States Patent
Yoder et al.

(10) Patent No.: US 8,925,990 B2
(45) Date of Patent: Jan. 6, 2015

(54) SLIDE-OUT ROOM SYSTEM HAVING WALL-MOUNTED DRIVE MECHANISMS WITH BRAKE

(71) Applicant: Lippert Components Manufacturing, Inc., Elkhart, IN (US)

(72) Inventors: Leonard D. Yoder, Elkhart, IN (US); Borivoj Krobot, La Porte, IN (US)

(73) Assignee: Lippert Components Manufacturing, Inc., Elkhart, IN (US)

( * ) Notice: Subject to any disclaimer, the term of this patent is extended or adjusted under 35 U.S.C. 154(b) by 93 days.

(21) Appl. No.: 13/660,619

(22) Filed: Oct. 25, 2012

(65) Prior Publication Data

US 2013/0106130 A1    May 2, 2013

Related U.S. Application Data

(60) Provisional application No. 61/551,719, filed on Oct. 26, 2011, provisional application No. 61/565,730, filed on Dec. 1, 2011, provisional application No. 61/647,908, filed on May 16, 2012, provisional application No. 61/664,542, filed on Jun. 26, 2012.

(51) Int. Cl.
*B60P 3/34* (2006.01)
*F16H 19/04* (2006.01)

(52) U.S. Cl.
CPC .. *F16H 19/04* (2013.01); *B60P 3/34* (2013.01)
USPC ..................... 296/26.14; 296/26.13; 296/171; 74/89.17

(58) Field of Classification Search
CPC .................................. F16H 19/04; B60P 3/34
USPC .......... 296/26.01, 26.02, 26.05, 26.12, 26.13, 296/26.14, 26.15, 171, 175; 74/89, 89.17
IPC ........................................................ B60P 3/34
See application file for complete search history.

(56) References Cited

U.S. PATENT DOCUMENTS

| | | | |
|---|---|---|---|
| 1,610,065 A * | 12/1926 | Meyer | 296/172 |
| 2,842,972 A * | 7/1958 | Houdart | 74/422 |
| 2,965,412 A | 12/1960 | Henderson et al. | |
| 3,137,041 A | 6/1964 | Mullen | |
| 4,235,542 A | 11/1980 | Paterik, Jr. | |
| 4,667,932 A | 5/1987 | Arbeloa | |
| 5,248,180 A | 9/1993 | Hussaini | |

(Continued)

FOREIGN PATENT DOCUMENTS

| | | |
|---|---|---|
| EP | 0065398 A1 | 11/1982 |
| FR | 1574680 A | 7/1969 |
| WO | 9856613 A1 | 12/1998 |
| WO | 0220309 A2 | 3/2002 |

*Primary Examiner* — Pinel Romain
(74) *Attorney, Agent, or Firm* — Barnes & Thornburg LLP

(57) ABSTRACT

An apparatus for moving a slide-out room disposed in an aperture of a side wall of a vehicle from a retracted position to an extended position in a drive direction. The apparatus includes a drive assembly supported by the side wall of the vehicle within the aperture, and the drive assembly includes a prime mover having a brake engagable to inhibit unintentional movement of the slide-out room. A driven assembly is driven by the drive assembly. The driven assembly is connected to a wall of the slide-out room such that the slide-out room moves with the driven assembly from the retracted position to the extended position in the drive direction.

17 Claims, 23 Drawing Sheets

(56) References Cited

U.S. PATENT DOCUMENTS

| | | |
|---|---|---|
| 5,577,351 A | 11/1996 | Dewald, Jr. et al. |
| 5,620,224 A | 4/1997 | DiBiagio et al. |
| 5,706,612 A | 1/1998 | Tillett |
| 5,758,918 A * | 6/1998 | Schneider et al. ......... 296/26.13 |
| 5,787,650 A * | 8/1998 | Miller et al. ...................... 52/67 |
| 5,902,001 A | 5/1999 | Schneider |
| 5,984,396 A | 11/1999 | Schneider |
| 6,052,952 A | 4/2000 | Frerichs et al. |
| 6,108,983 A | 8/2000 | Dewald, Jr. et al. |
| 6,116,671 A | 9/2000 | Schneider |
| 6,182,401 B1 | 2/2001 | McManus et al. |
| 6,202,362 B1 | 3/2001 | McManus et al. |
| 6,209,477 B1 | 4/2001 | Biedenweg |
| 6,234,566 B1 | 5/2001 | Cyr et al. |
| 6,325,437 B2 * | 12/2001 | Hiebert et al. ............. 296/26.01 |
| 6,428,073 B1 * | 8/2002 | Blodgett, Jr. ............... 296/26.14 |
| 6,533,338 B1 * | 3/2003 | Frerichs et al. ............ 296/26.14 |
| 6,575,514 B2 * | 6/2003 | McManus et al. ......... 296/26.01 |
| 6,619,713 B2 | 9/2003 | Eichhorn |
| 6,729,669 B2 | 5/2004 | McManus et al. |
| 6,783,164 B2 | 8/2004 | Bortell |
| 6,802,555 B2 | 10/2004 | Yoder et al. |
| 6,948,754 B2 | 9/2005 | Huffman et al. |
| 7,198,320 B2 | 4/2007 | Rasmussen |
| 7,204,536 B2 * | 4/2007 | Kunz ........................ 296/26.01 |
| 7,234,747 B2 * | 6/2007 | Rasmussen ............... 296/26.01 |
| 7,293,814 B2 * | 11/2007 | Blodgett, Jr. ............... 296/26.01 |
| 7,316,439 B1 | 1/2008 | Crean |
| 7,354,088 B2 | 4/2008 | Garceau et al. |
| 7,367,171 B2 * | 5/2008 | Bertram et al. ................. 53/551 |
| 7,370,900 B1 * | 5/2008 | Blodgett, Jr. ............... 296/26.12 |
| 7,527,313 B2 * | 5/2009 | Peter ........................ 296/26.12 |
| 7,802,834 B2 | 9/2010 | Cadena et al. |
| 7,874,604 B2 * | 1/2011 | Dixon et al. ............... 296/26.13 |
| 8,016,343 B2 | 9/2011 | Schwindaman et al. |
| 2002/0084663 A1 | 7/2002 | McManus et al. |
| 2002/0180232 A1 | 12/2002 | Schneider et al. |
| 2004/0066060 A1 | 4/2004 | Rasmussen |
| 2005/0225109 A1 | 10/2005 | Schneider |
| 2005/0230989 A1 | 10/2005 | Nebel |
| 2006/0219314 A1 * | 10/2006 | Bertram et al. ................. 141/10 |
| 2008/0265618 A1 | 10/2008 | Cadena et al. |
| 2011/0024706 A1 | 2/2011 | Schwindaman et al. |
| 2011/0025091 A1 | 2/2011 | Schwindaman et al. |
| 2011/0156430 A1 | 6/2011 | Gardner |

* cited by examiner

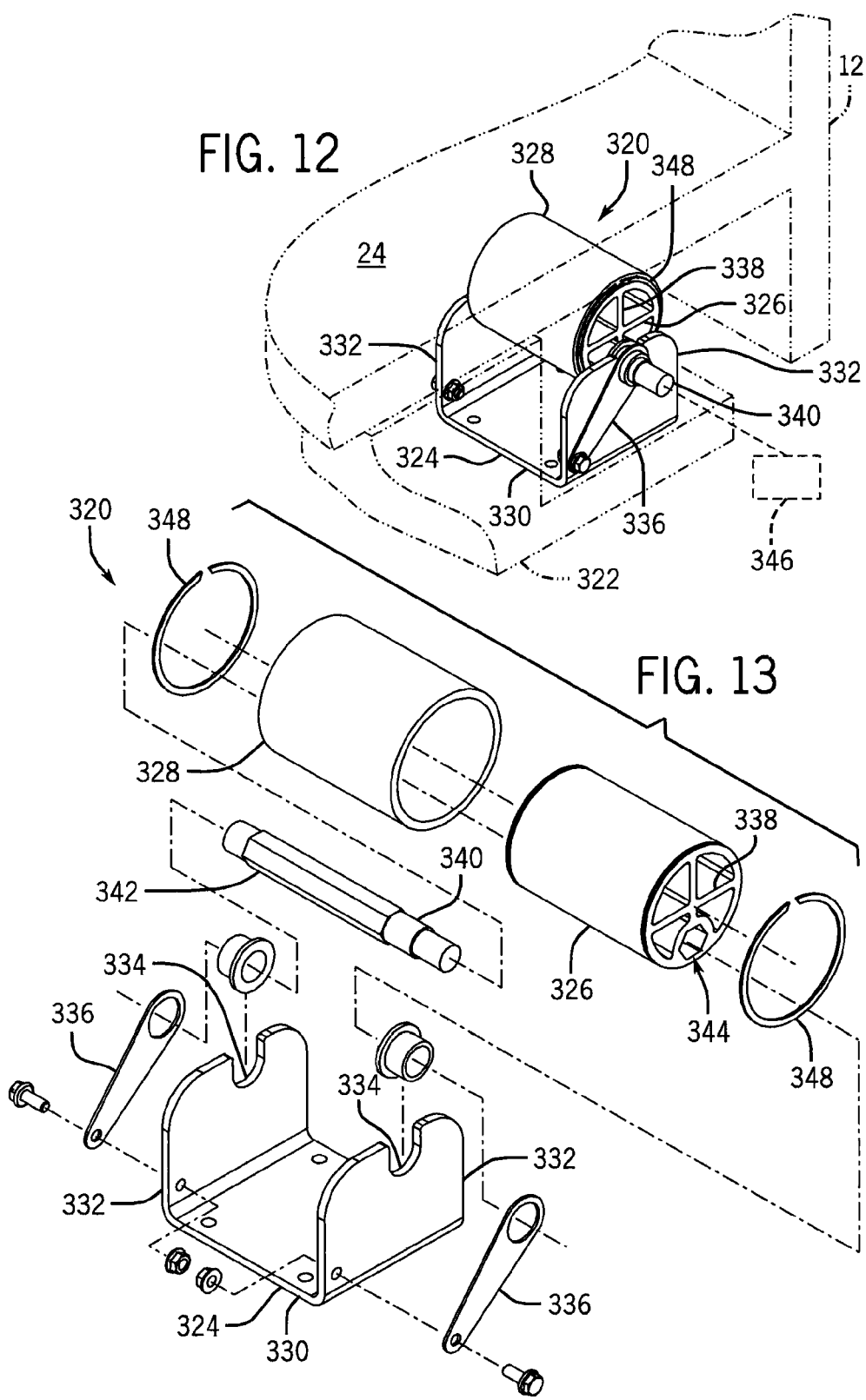

SLIDE-OUT ROOM SYSTEM HAVING WALL-MOUNTED DRIVE MECHANISMS WITH BRAKE

CROSS-REFERENCE TO RELATED APPLICATIONS

This application claims the benefit of U.S. Provisional Patent Application No. 61/664,542 filed Jun. 26, 2012, U.S. Provisional Patent Application No. 61/647,908 filed May 16, 2012, U.S. Provisional Patent Application No. 61/565,730 filed Dec. 1, 2011, and U.S. Provisional Patent Application No. 61/551,719 filed Oct. 26, 2011, the disclosures of which are hereby incorporated by reference.

STATEMENT REGARDING FEDERALLY SPONSORED RESEARCH OR DEVELOPMENT

Not applicable.

FIELD OF THE INVENTION

This invention generally relates to slide-out rooms of recreational vehicles, and more particularly, slide-out rooms having multiple compact wall-mounted drive mechanisms.

BACKGROUND OF THE INVENTION

Some recreational vehicles include extendable slide-out rooms to increase the size of the living quarters while also providing an appropriate size for highway travel. Such slide-out rooms are driven by various types of mechanisms, such as hydraulic cylinders, electric drive screws, or rack-and-pinion gear drives. Rack-and-pinion drive mechanisms sometimes connect to a recreational vehicle within the aperture in which the slide-out room moves. These slide-out mechanisms are considered aesthetically pleasing because the components, except for the gear racks mounted to the side walls of the slide-out room, are relatively inconspicuous.

Nevertheless, wall mounted rack-and-pinion drive mechanisms have several drawbacks. For example, the side walls that mount the gear racks are typically skewed (that is, not parallel) relative to the direction in which the room moves or each other due to manufacturing tolerances. As such, the gear racks are typically skewed relative to the drive direction, which in turn may cause several problems. First, the gear racks may simply move away from and disengage the pinions as the slide-out room moves. Second, if the drive mechanism includes some type of feature that attempts to hold the gear rack in engagement with the pinion (for example, a pinion support bracket that engages the gear rack), the slide-out room wall may bend or deform because the rack urges it away from its manufactured position.

Some designs have attempted to address the above problems. These designs typically include a pinion mounting bracket that is movably mounted to the vehicle in a transverse direction (that is, a direction perpendicular to the drive direction). As such, the pinion moves relative to the vehicle and remains in engagement with the gear rack even if the gear rack is skewed relative to the drive direction.

However, these designs introduce yet another problem. To permit the mounting bracket and pinion to move in the transverse direction, a small clearance space (about 0.5 inch) is provided in the transverse direction between the bracket and a channel that houses the bracket. As such, the pinion mounting bracket, the gear racks, and the slide-out room may shift in the transverse direction as the vehicle moves. In particular, when the vehicle comes to a stop, the large mass of the room may cause the room to shift over the clearance space, and the pinion mounting bracket may abruptly strike the support channel. Such an action could damage the drive mechanism and could be relatively loud for the vehicle's occupants.

This problem is difficult to address because of the pinion mounting bracket's position within the support channel. Furthermore, even if the mounting bracket can be accessed, fixing the bracket in the transverse direction again causes the original problem of the gear rack disengaging the pinion.

As another example of the limitations of rack-and-pinion drive mechanisms, the components that support the weight of the slide-out room are also disposed within the aperture and are typically relatively small due to the limited space. These small supports can only carry a relatively small load, which essentially limits wall mounted rack-and-pinion mechanisms to use with relatively small and light slide-out rooms. Similarly, the weight of the slide-out room is transmitted to the supports from the rack, which is in turn supported by one of the slide-out room walls. The slide-out room walls typically comprise a light-weight (and low-strength) material such as wood and, as such, the slide-out room walls can only carry a relatively small load. This again limits wall mounted rack-and-pinion mechanisms to use with relatively small and light slide-out rooms.

Another drawback of wall mounted rack-and-pinion mechanisms is that the slide-out room typically only moves horizontally between the retracted position and the extended position and vice versa. As such, the slide-out room cannot act as a so-called "flush floor" room in which the floor of the slide-out room moves downwardly and is level with the floor of the vehicle in the extended position to eliminate the step between the vehicle and slide-out room.

As yet another example of the limitations of rack-and-pinion drive mechanisms, a speed reducer (for example, a gearbox) connecting a drive motor to the pinion is not sufficient for inhibiting unintentional movement of the slide-out room while the vehicle travels, or to maintain the seals in compression over extended periods of time when the vehicle is parked. That is, the speed reducer provides a relatively large reduction ratio and is difficult to back-drive. Nevertheless, the speed reducer may be back-driven by the large forces imparted by the slide-out room when the vehicle accelerates or turns, or wind or other lateral forces applied to the vehicle over time even if stationary. As such, the slide-out room may unintentionally move out or in.

Therefore, what is needed is a slide-out room drive mechanism that addresses one or more of the drawbacks described above.

SUMMARY OF THE INVENTION

In one aspect, the present invention provides an apparatus for moving a slide-out room disposed in an aperture of a side wall of a vehicle from a retracted position to an extended position in a drive direction. The apparatus includes a drive assembly supported by the side wall of the vehicle within the aperture, and the drive assembly includes a prime mover having a brake engagable to inhibit unintentional movement of the slide-out room. A driven assembly is driven by the drive assembly. The driven assembly is connected to a wall of the slide-out room such that the slide-out room moves with the driven assembly from the retracted position to the extended position in the drive direction.

In another aspect, the present invention provides an apparatus for moving a slide-out room disposed in an aperture of a side wall of a vehicle from a retracted position to an extended position in a drive direction. The apparatus includes a drive assembly supported by the side wall of the vehicle. The drive assembly includes a prime mover having a dynamic brake that is automatically engagable when the prime mover is de-energized. A driven assembly is driven by the drive assembly. The driven assembly is connected to a wall of the slide-out room such that 1) the slide-out room moves with the driven assembly from the retracted position to the extended position in the drive direction, and 2) the driven assembly is movable in a transverse direction generally perpendicular to the drive direction relative to the wall of the slide-out room.

In yet another aspect, the present invention provides an apparatus for moving a slide-out room disposed in an aperture of a side wall of a vehicle from a retracted position to an extended position in a drive direction. The apparatus includes a drive assembly supported by the side wall of the vehicle. The drive assembly includes a drive support and a prime mover supported by the drive support. The prime mover includes a brake engagable to inhibit unintentional movement of the slide-out room. A pinion is rotatably supported by the drive support and driven by the prime mover. The apparatus further includes a driven assembly supported by a wall of the slide-out room. The driven assembly includes a room engaging bracket connected to the slide-out room. The driven assembly further includes a rack connected to the room engaging bracket and driven by the pinion such that 1) the slide-out room moves with the rack from the retracted position to the extended position in the drive direction, and 2) the rack is movable in a transverse direction generally perpendicular to the drive direction relative to the wall of the slide-out room. The drive support engages the rack to inhibit the rack from disengaging the pinion.

The foregoing and other advantages of the invention will appear in the detailed description which follows. In the description, reference is made to the accompanying drawings which illustrate a preferred embodiment of the invention.

BRIEF DESCRIPTION OF THE DRAWINGS

FIG. 5 is a detail side section view of the drive mechanism within line 5-5 of FIG. 4;

FIG. 12 is a perspective view of a roller mechanism supporting the slide-out room of FIG. 1;

FIG. 13 is an exploded perspective view of the roller mechanism of FIG. 12;

DETAILED DESCRIPTION OF THE PREFERRED EMBODIMENT

Drive mechanisms for a slide-out room system according to the present invention are supported within the aperture of a vehicle. These mechanisms include gear racks that are movable relative to the slide-out room's walls. Such a construction permits use of other components or features that inhibit the slide-out room from shifting as the vehicle moves. Furthermore, in some embodiments, these mechanisms do not support the weight of the slide-out room and are configured to move or "float" vertically relative to the vehicle. This motion permits the slide-out room to descend near the extended position such that the floor of the slide-out room is flush with the floor of the vehicle. These aspects of the invention are described in further detail in the following paragraphs, beginning with the general structure of the vehicle, the drive mechanisms, support mechanisms that permit the slide-out room to descend near the extended position, and concluding with various alternative embodiments.

Figure 1:
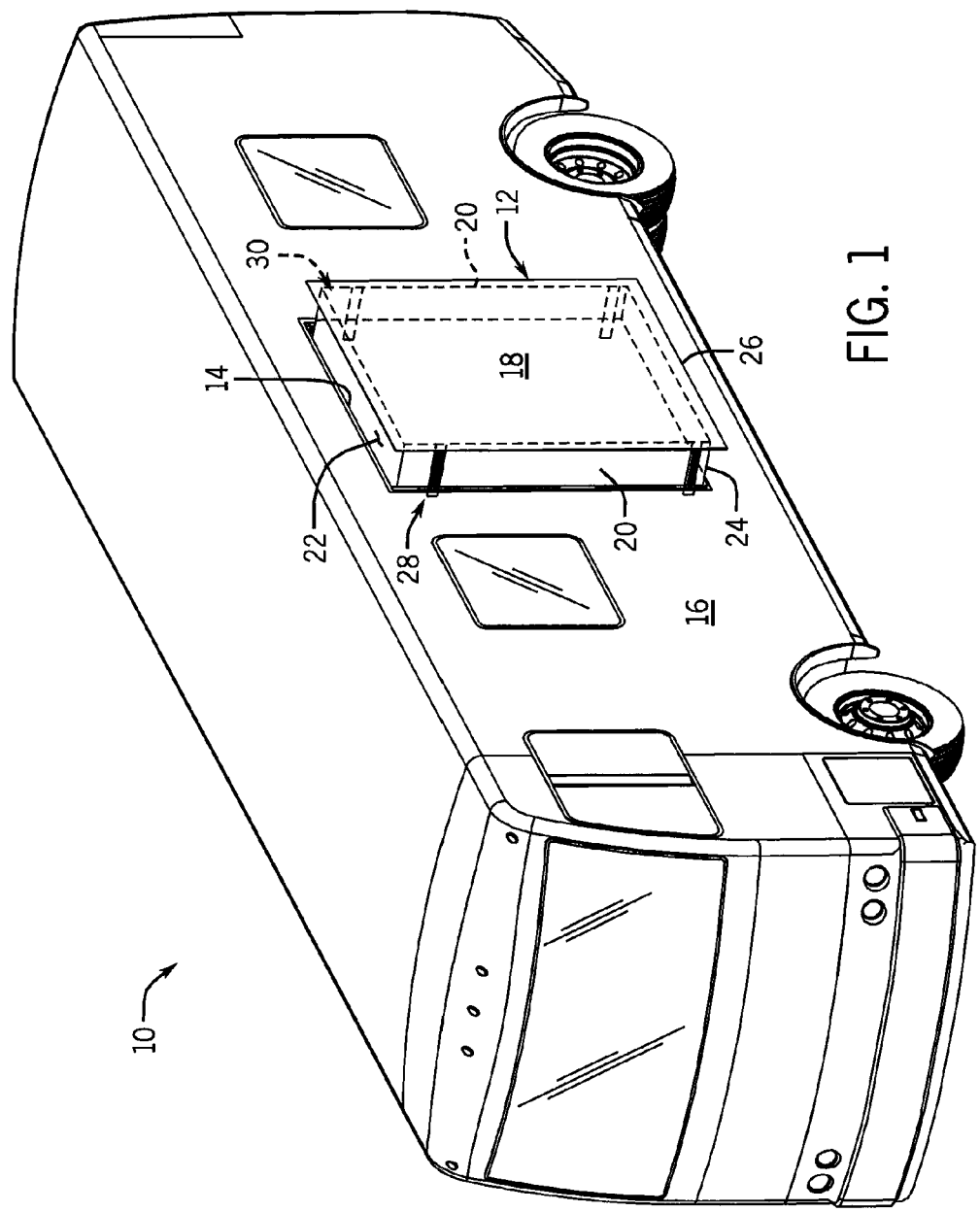
FIG. 1 is a perspective view of a recreational vehicle with a slide-out room system according to the present invention.
Figure 2:
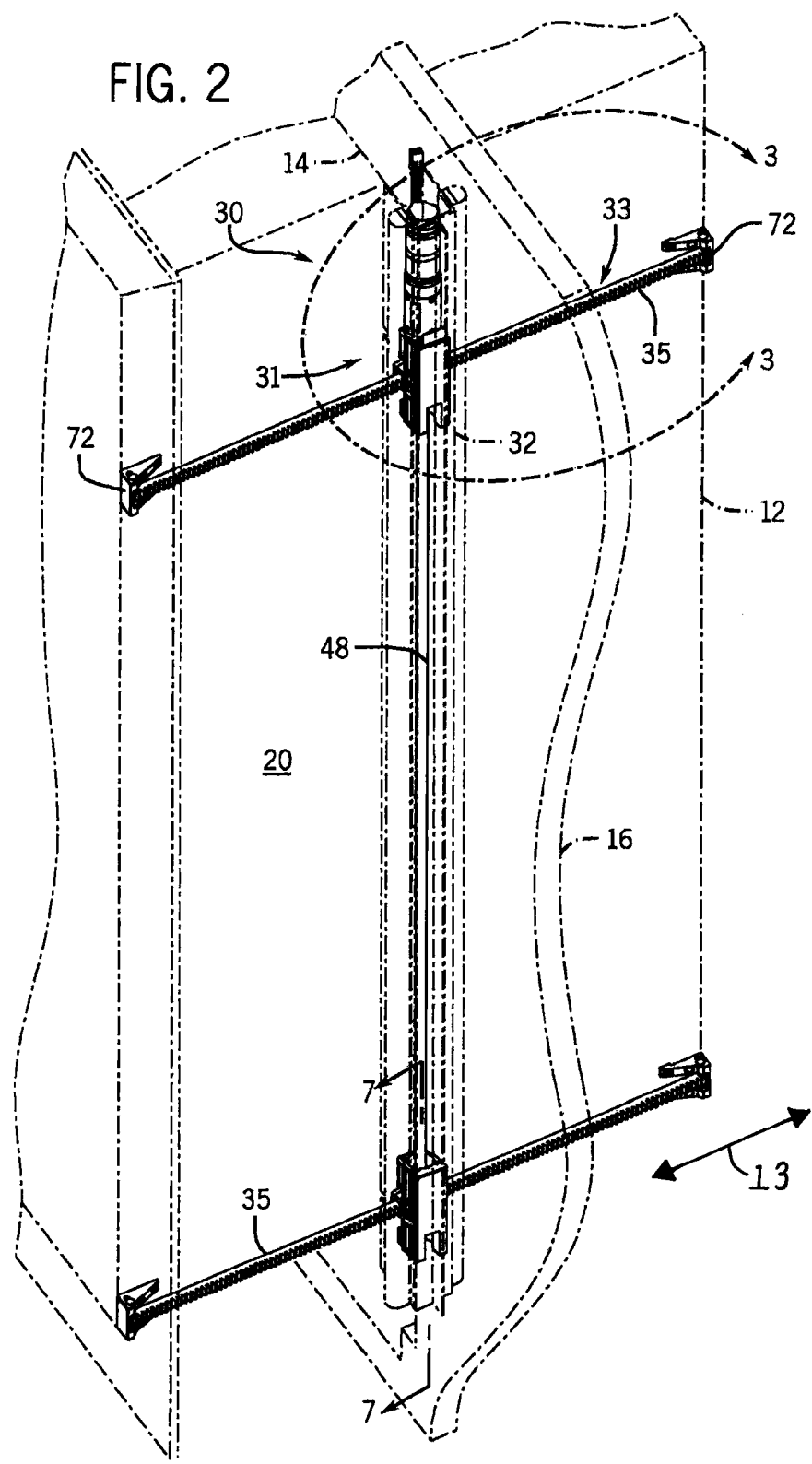
FIG. 2 is a detail perspective view of a drive mechanism of the slide-out room system of FIG. 1.

Referring first to FIGS. 1 and 2, a recreational vehicle 10 supports a slide-out room 12 in an aperture 14 of a vehicle side wall 16. An interior of the slide-out room 12 is defined by a leading or outside wall 18, side walls 20, a ceiling 22, and a floor 24. The leading wall 18 includes a fascia 26, and the plane of the fascia 26 is parallel to the respective planes of the aperture 14 and the side wall 16. The surface of the fascia 26 facing the side wall 16 includes a seal (not shown). The seal is compressed between the fascia 26 and the side wall 16 when the slide-out room 12 is retracted to prevent leaks between the cabin of the recreational vehicle 10 and the outside environment. The side walls 20 of the slide-out room 12 also include flanges (not shown) located inside the vehicle 10. The surface of the flanges facing the side wall 16 also includes a seal (not shown) to prevent leaks between the cabin of the recreational vehicle 10 and its environment when the slide-out room 12 is extended.

The slide-out room 12 is moved in a drive direction 13 between the extended and retracted positions by two drive mechanisms 28 and 30 (FIG. 1), and one of the drive mechanisms 28 and 30 connects to each of the side walls 20. The drive mechanisms 28 and 30 are generally identical except for being disposed in mirrored relation to one another. As such, only the drive mechanism 30 will be described below for simplicity.

Referring to FIGS. 2-9, the slide-out room drive mechanism 30 generally includes a drive assembly or pinion assembly 31 that is partially disposed in a support channel 32 positioned in the aperture 14 of the vehicle side wall 16. The drive assembly 31 drives a driven assembly 33 (which generally includes a rack 35 as described in further detail below) connected to one of the side walls 20 of the slide-out room 12. As shown most clearly in FIG. 2, the drive mechanism 30 includes upper and lower sections that are disposed adjacent upper and lower sections of the slide-out room side wall 20, respectively.

Figure 3:
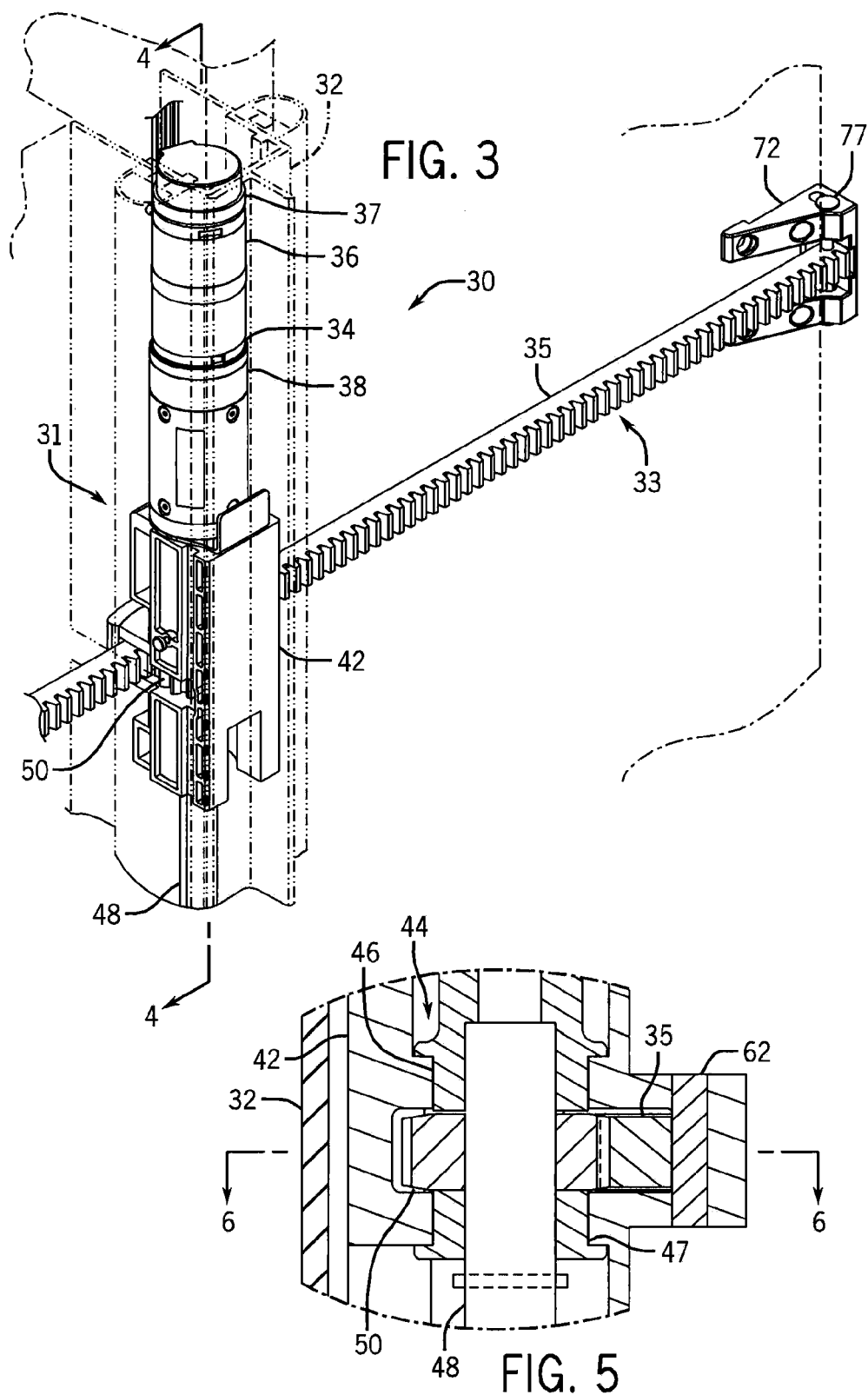
FIG. 3 is a detail perspective view of the drive mechanism within line 3-3 of FIG. 2.
Figure 4:
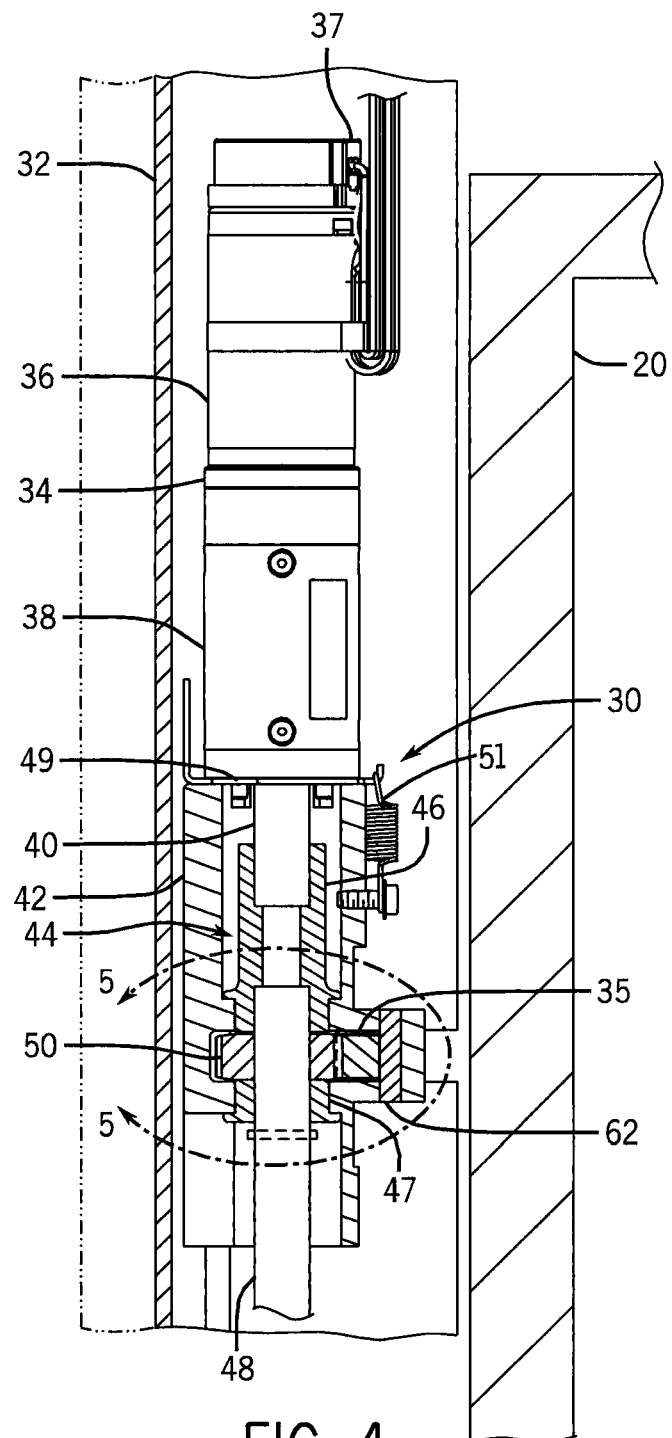
FIG. 4 is a side section view of an upper section of the drive mechanism along line 4-4 of FIG. 3.

Referring specifically to FIGS. 3-5 and turning first to the upper section, the drive mechanism 30 includes a prime mover 34 that receives power from a dedicated battery (not shown), the vehicle's alternator (not shown), or the like. The prime mover 34 may include a high-speed permanent magnet or brushless 12V DC motor 36 or the like. In some embodiments, the motor 36 includes a rotary encoder (e.g., a Hall effect rotary encoder) and/or dynamic brakes 37 that are operatively connected to the same electrical circuit as the motor 36. Such dynamic brakes 37 automatically engage when power to the motor 36 is interrupted.

Alternatively, the dynamic brakes 37 may be replaced by other types of brakes that are adapted to arrest movement of the drive mechanism 30. The brake 37 prevents the drive train from moving in the reverse direction and thus maintains the gasket seals in a compressed state in the retracted position and/or the extended position of the room 12. When in the retracted position, this also inhibits the room 12 from moving in the direction of vehicle travel due to inertia (e.g., when the vehicle 10 abruptly slows or stops) because of friction of the gasket seals in compression.

The prime mover 34 further includes a speed reducer 38, such as a planetary gear transmission, a spur gear transmission, or the like, driven by the motor 36 and having a rotatable output shaft 40 (FIG. 4). The speed reducer 38 significantly reduces the rotational speed provided by the motor 36 and significantly increases the torque. An appropriate torque may be determined based on the size and weight of the slide-out room 12. Appropriate prime movers 34 including the motor 36, the dynamic brakes 37, and the speed reducer 38 are available from Merkle-Korff Industries of Elk Grove Village, Ill. Other appropriate prime movers 34 are available from Rexnord Corporation of Milwaukee, Wis., Stature Electric, Inc. of Watertown, N.Y., and the like.

Figure 6:
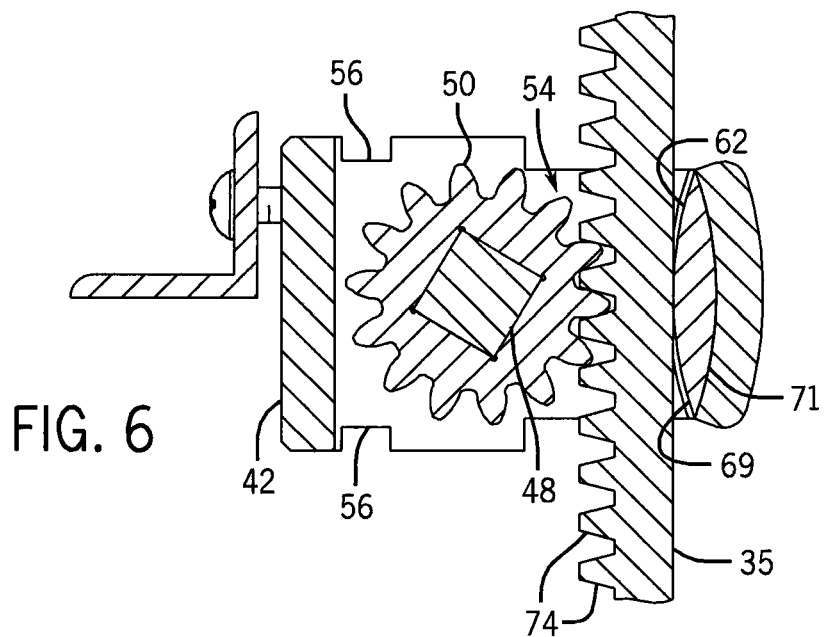
FIG. 6 is a top section view of the drive mechanism along line 6-6 of FIG. 5.
Figure 7:
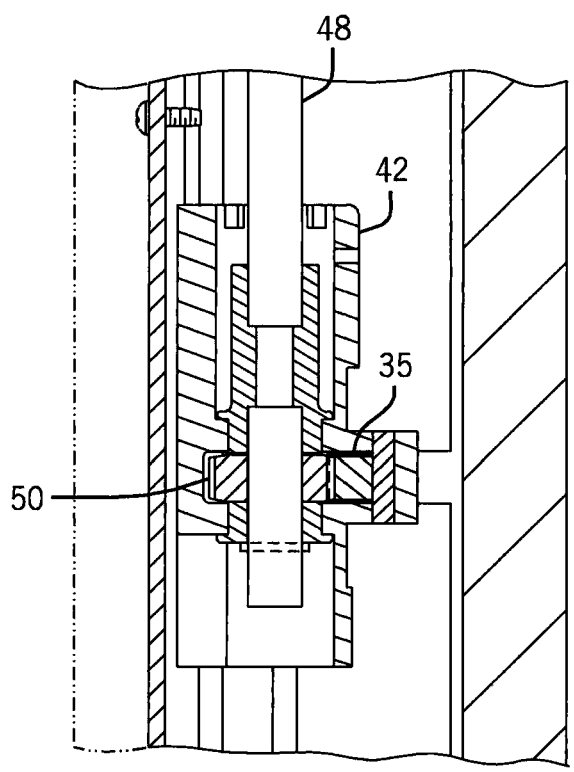
FIG. 7 is a side section view of a lower section of the drive mechanism of FIG. 2.

Turning to FIGS. 4-6, the motor 36 and the speed reducer 38 are supported by a drive support 42 disposed therebelow. The drive support 42 may comprise various materials, such as molded plastics, machined metal, or the like. Internally, the drive support 42 is hollow and defines a passageway 44 that receives a combined coupling/bushing 46 connecting the output shaft 40 to a drive shaft 48 (e.g., a square cross-sectional drive shaft). Within the passageway 44, the combined coupling/bushing 46 and a lower bushing 47 support the drive shaft 48. Vertically near the middle of the drive support 42, the passageway 44 is sized to receive a pinion gear 50 supported by the drive shaft 48. The passageway 44 also has an opening 54 (FIG. 6) to permit the pinion 50 to engage the driven assembly 33, specifically the rack 35, which will be described in further detail below.

Externally, the surfaces of the drive support 42 engage several components. For example, the drive support 42 includes an upper surface that abuts a mounting bracket 49 connected to the prime mover 34. The mounting bracket 49 is connected to the drive support 42 via an extension spring 51 fastened to the drive support 42.

In addition, the side surfaces of the drive support 42 are not fixedly connected to the support channel 32. Instead, the side surfaces of the drive support 42 include keyways 56 (FIG. 6) that extend in the longitudinal direction of the support channel 32 and receive keys (not shown) on the inner sides of the support channel 32. As shown in the figures, the keyways 56 have square cross-sectional shapes, although other shapes may be used provided that they permit the drive support 42 to "float" in the longitudinal direction of the support channel 32 (that is, to move in an "elevation" or vertical direction generally perpendicular to the drive direction). This ability to "float" permits the slide-out room 12 to act as a "flush floor" room in some embodiments and ensures the weight of the slide-out room 12 is supported by relatively strong components spaced apart from the drive mechanism 30. That is, rollers disposed on the underside of the room 12 support the weight of the slide-out room 12 whether it acts as a flush floor room or a non-flush floor room (i.e., a "flat floor" room; see FIG. 19 and the associated description). This aspect is described in further detail below.

The front face of the drive support 42 includes a mounting support 62 that is disposed proximate the opening 54 and between the pinion gear 50 and the slide-out room wall 20. The mounting support 62 also engages the rack 35 and is disposed between the rack 35 and the slide-out room wall 20. As such, the mounting support 62 inhibits the rack 35 from disengaging the pinion gear 50. Furthermore, the mounting support 62 may include front and rear convex surfaces 69 and 71 that generally face in a transverse direction (i.e., a direction generally perpendicular to both the drive direction and the elevation direction, or the direction of vehicle movement over the road). The convex surfaces 69 and 71 advantageously reduce friction forces between the mounting support 62 and the rack 35 and, similarly, permit the rack 35 to be skewed relative to the slide-out room side walls 20.

Figure 8:
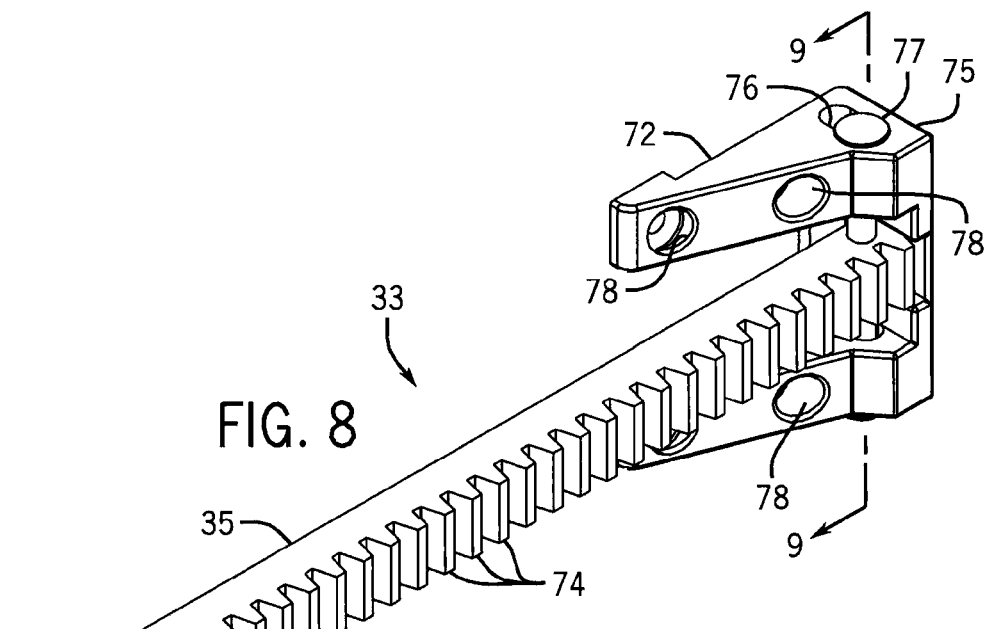
FIG. 8 is a detail perspective view of a driven assembly of the drive mechanism of FIG. 2.
Figure 9:
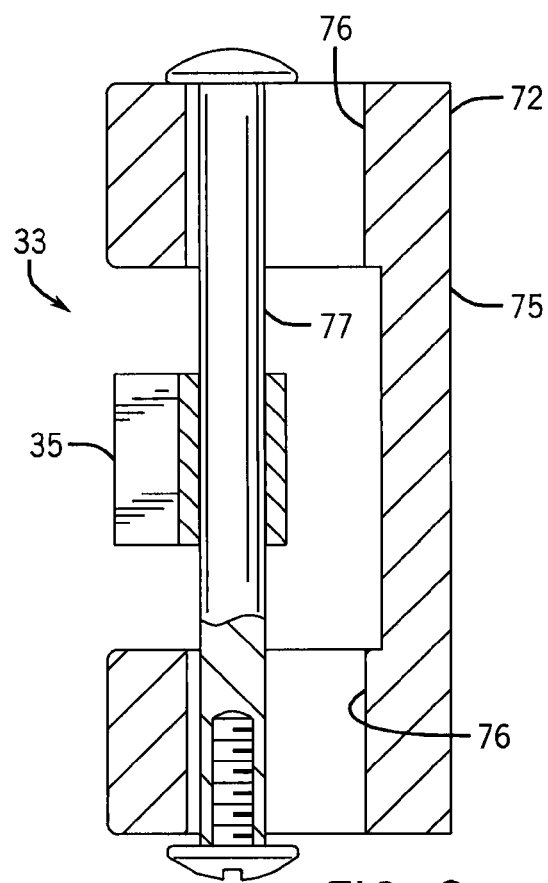
FIG. 9 is a side section view of the drive assembly along line 9-9 of FIG. 8.

Referring specifically to FIGS. 3, 8, and 9, the driven assembly 33 includes the rack 35 and two room engaging brackets 72 secured to the side wall 20 and supporting opposite ends of the rack 35. The rack 35 is a generally elongated component in the drive direction and may comprise various materials, such as hobbed aluminum or the like. The rack 35 also includes a plurality of gear teeth 74 that engage teeth of the pinion gear 50 and permit the rack 35 to be driven by the pinion gear 50.

The room engaging brackets 72 each have a horseshoe-like shape as viewed in the transverse direction. A base 75 of each bracket 72 includes transversely-elongated slots 76 for receiving pins 77 extending in the elevation direction and connecting the rack 35 to the bracket 72. This "pin-in-slot" connection permits the rack 35 to move in the transverse direction as the slide-out room 12 moves in the drive direction.

Each bracket 72 also includes a plurality of through holes 78 for receiving fasteners (not shown) that connect the bracket 72 to the slide-out room wall 20.

Turning again to FIGS. 2 and 7, the drive shaft 48 extends below the drive support 42 to the lower section of the drive mechanism 30. In general, the lower section of the drive mechanism 30 is identical to the upper section below the prime mover 34. That is, the lower section of the drive mechanism 30 generally includes a drive support 42 that rotatably mounts a pinion gear 50 and holds a rack 35 in engagement with the pinion gear 50, and can slide up and down vertically in the channel 32.

From the above it should be apparent that both drive mechanisms 28 and 30 receive power to move the slide-out room 12 relative to the rest of the vehicle 10. In some embodiments, the prime movers 34 of the drive mechanisms 28 and 30 may be synchronized to ensure that the slide-out room side walls 20 move in an appropriate manner relative to one another. The prime movers 34 may be synchronized as described in U.S. patent application Ser. No. 13/197,291, U.S. Pat. App. Pub. 2009/0261610, U.S. Pat. No. 6,536,823, U.S. Pat. No. 6,345,854, U.S. Pat. No. 6,471,275, or U.S. Pat. No. 6,696,813, the disclosures of which are hereby incorporated by reference. The prime movers 34 may alternatively be synchronized in other manners not described explicitly herein. For example, the prime movers 34 may be mechanically synchronized (via a shaft and gears, a chain and sprockets, or the like, connecting the two drive mechanisms 28 and 30).

The drive mechanisms 28 and 30 may be operated by a single rocker switch (not shown). Along with synchronization as described above, sensors (not shown) mounted to the mechanisms 28 and 30 detect when the slide-out room 12 is extended to a first certain position. In that position, the horizontal prime movers 34 are de-energized and a vertical prime mover (e.g., 346; see below) is energized to raise or lower the room 12 to a second certain position. The sensors detect when the slide-out room 12 occupies the second certain position. In that position, the vertical prime mover is de-energized and the horizontal prime movers 34 are re-energized to move the room 12 horizontally. This results in a square "Z" type of movement.

The drive mechanisms 28 and 30 may also be controlled in an "automatic jog mode". That is, if the sensors detect no movement of one of the drive mechanisms 28 or 30 in one direction, the other mechanism 28 or 30 will also be de-energized. Subsequently, movement of the mechanisms 28 and 30 in the same direction is not allowed, and movement of the mechanisms 28 and 30 in the opposite direction is the only direction permitted. If the sensors detect no movement of the same drive mechanism 28 or 30 in the opposite direction, the other mechanism 28 or 30 will be de-energized and the system is put into an emergency retract mode or "automatic jog mode". In this mode, the system only permits a short time of movement in the direction of a button push. Instead, multiple button pushes are needed to fully retract or extend the room 12.

Figure 10:
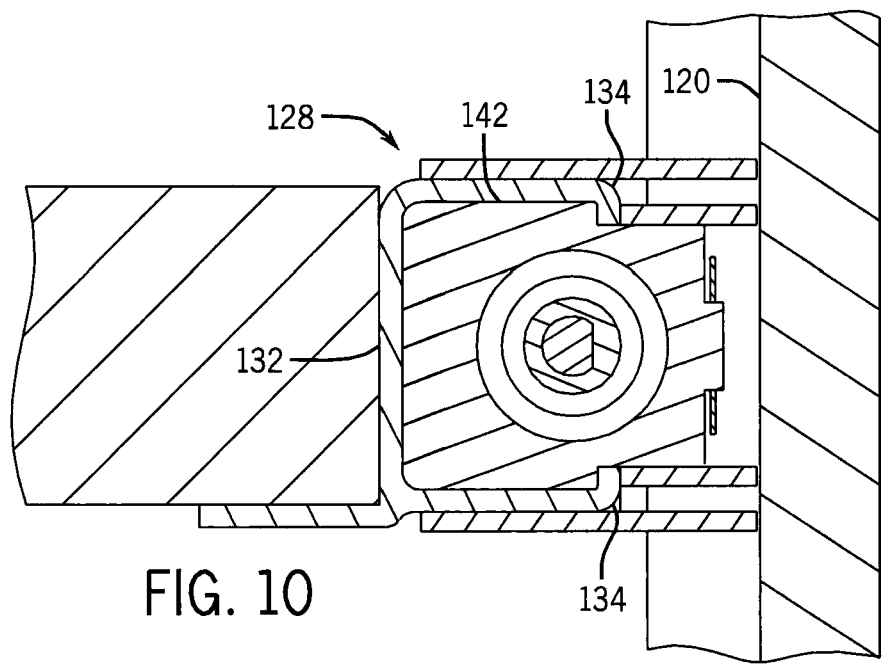
FIG. 10 is a top sectional view of a second embodiment of the drive mechanism illustrating an interface between a support channel and a drive support.

Turning now to FIG. 10, a second embodiment of the drive mechanism 130 is generally as described above. However, the support channel 132 includes one or more lips 134 that connect to an edge proximate the slide-out room side wall 120 and extend in the drive direction. The lips 134 also extend between the drive support 142 and the slide-out room side wall 120, or "wrap" around the drive support 142, to inhibit the drive support 142 from moving out of the channel 132 in the transverse direction. However, the lips 134 permit the drive support 142 to float in the elevation direction as described above.

Figure 11:
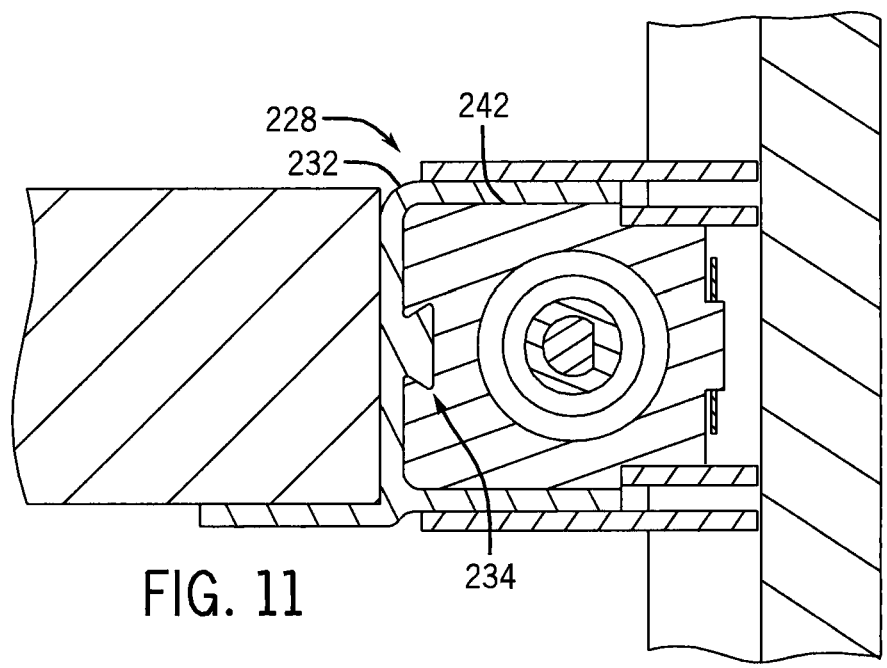
FIG. 11 is a top sectional view of a third embodiment of the drive mechanism illustrating an interface between the support channel and the drive support.
Figure 14:
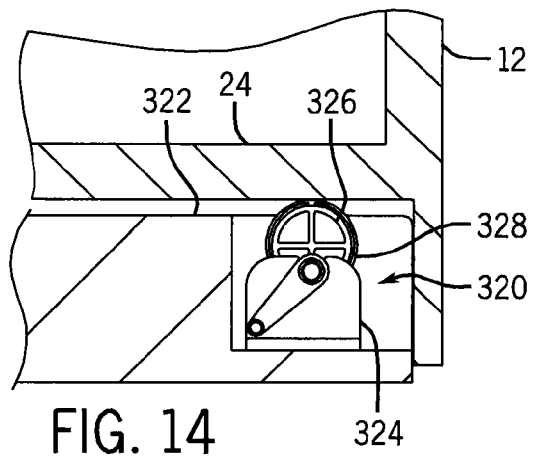
FIG. 14 is a section view of the slide-out room in the retracted position.

Referring to FIG. 11, a third embodiment of the drive mechanism 230 is also generally as described above. However, the support channel 232 and the drive support 242 include an interface 234 proximate the rear wall of the channel 232 to connect the two components. As shown in the figures, the interface 234 may have a dovetail shape. Other shapes may be used provided that they inhibit the drive support 242 from moving out of the channel 232 in the transverse direction and permit the drive support 242 to float in the elevation direction.

Referring to FIGS. 12-18 and as briefly described above, in some embodiments the ability of the drive supports 42 to float in the elevation direction permits the slide-out room 12 to be used as a flush floor room. As the name implies, the floor of such a flush floor room moves downwardly and is level with the floor of the vehicle in the extended position (see FIG. 18). To facilitate such downward movement of the slide-out room 12, the vehicle 10 mounts one or more roller or support mechanisms 320 between its floor 322 and the floor 24 of the slide-out room 12.

Generally, the support mechanism 320 includes a roller support bracket 324 that eccentrically and rotatably mounts an inner roller 326. The inner roller 326 concentrically and rotatably mounts an outer roller 328 that engages the floor 24 of the slide-out room 12.

As shown most clearly in FIGS. 12 and 13, the roller support bracket 324 is a generally U-shaped component as viewed in the drive direction and may be a stamped and bent piece of metal or the like. The roller support bracket 324 includes a base 330 that engages the vehicle floor 322, and two edges of the base 330 connect to upwardly extending side walls 332. Each side wall 332 includes a notch 334 (FIG. 13)

for receiving the inner roller 326, and each side wall 332 connects to a support link 336 that holds the inner roller 326 in the notches 334.

The inner roller 326 is a generally cylindrical component and may be a molded plastic or the like. The inner roller 326 also includes internal walls 338 to connect to the roller support bracket 324. In particular, the walls 338 engage an axle 340 that is supported by the support links 336. The axle 340 extends eccentrically through the inner roller 326, and the axle 340 rotatably fixedly connects to the inner roller 326 via a non-circular cross-sectional shaped portion 342 (for example, a hexagonal cross-sectional shape as shown in FIG. 13) that is received in a non-circular cross-sectional shaped passageway 344 defined by the internal walls 338. As such, a prime mover 346 (for example, an electric motor or the like as shown in FIG. 12) may drive the axle 340 and eccentrically rotate the inner roller 326.

The outer roller 328 is a generally cylindrical component and may be a molded plastic or the like. The outer roller 328 concentrically and rotatably mounts over the inner roller 326. The inner roller 326 may also support snap rings 348 on the sides of the outer roller 328 to inhibit the outer roller 328 from moving axially relative to the inner roller 326.

Figure 15:
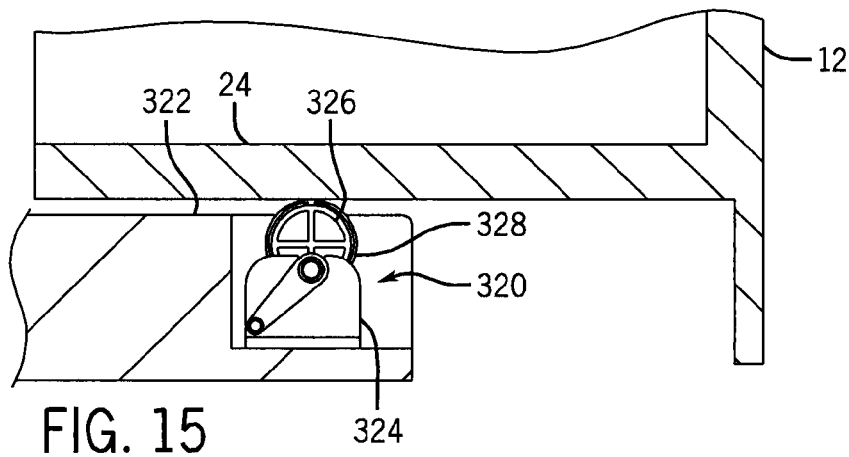
FIG. 15 is a section view of the slide-out room moving toward the extended position.
Figure 16:
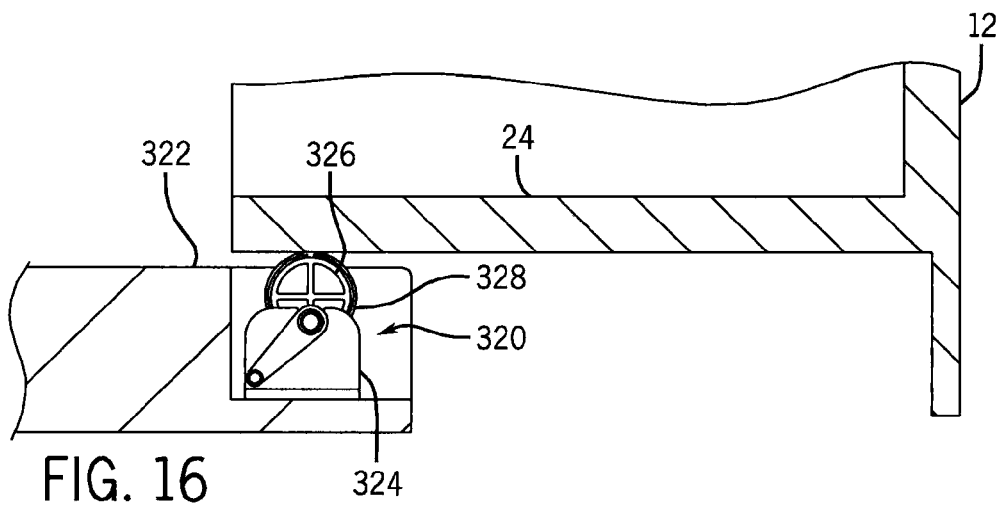
FIG. 16 is another section view of the slide-out room moving toward the extended position.
Figure 17:
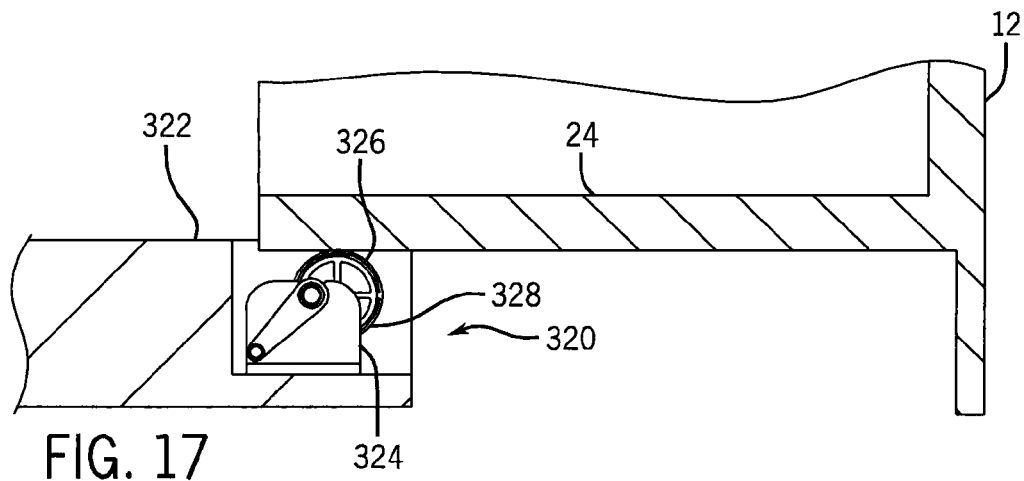
FIG. 17 is another section view of the slide-out room moving toward the extended position and the roller mechanism lowering the slide-out room in the elevation direction.
Figure 18:
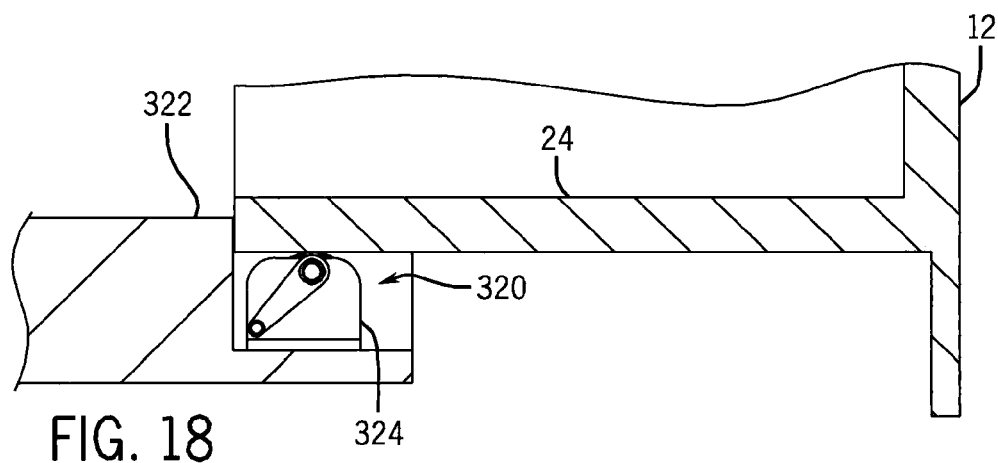
FIG. 18 is a section view of the slide-out room in the extended position with the slide-out room lowered in the elevation direction to provide a "flush floor" configuration.

Together, the inner roller 326 and the outer roller 328 lower the slide-out room 12 in the elevation direction as follows. The inner roller 326 and the outer roller 328 are first disposed in the position shown in FIG. 14 when the slide-out room 12 is in the retracted position; that is, the inner and outer rollers 326 and 328 hold the slide-out floor 24 above the vehicle floor 322. As the slide-out room 12 begins to move toward the extended position as shown in FIG. 15, the outer roller 328 rotates as the slide-out floor 24 moves thereover and the inner roller 326 remains stationary. When the slide-out room 12 is nearly fully extended as shown in FIG. 16, the prime mover 346 is energized to eccentrically rotate the inner roller 326 in a clockwise direction as shown in FIG. 17. This action lowers the slide-out room 12 relative to the vehicle floor 322, and the prime mover 346 is de-energized to stop the inner roller 326 when the slide-out floor 24 is flush with the vehicle floor 322 as shown in FIG. 18.

The support mechanism 320 and the slide-out room 12 generally move in the opposite manner to raise the slide-out room 12 as the room 12 moves from the extended position to the retracted position.

Figure 19:
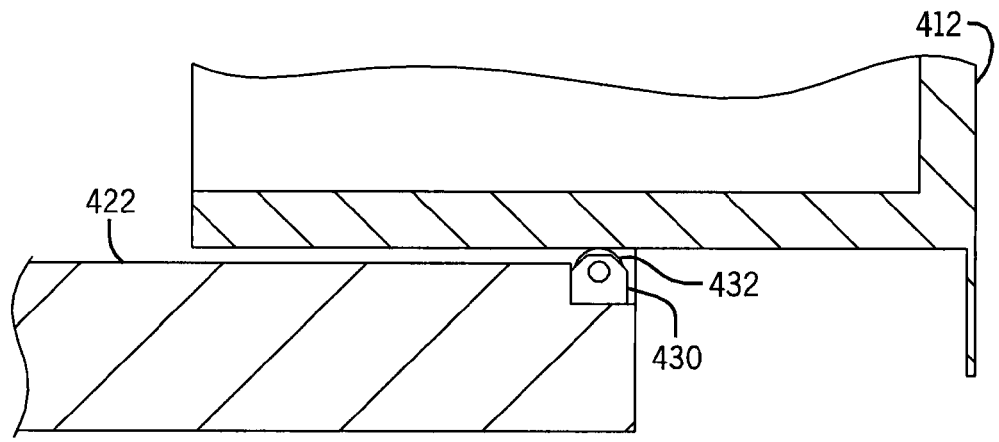
FIG. 19 is a section view of a slide-out room including a non-flush floor roller.

Referring to FIG. 19, in the embodiments described above the slide-out room need not act as a flush floor room. That is, the floor 422 of the vehicle may fixedly mount brackets 430 (only a single bracket is shown) that each rotatably support a roller 432. The rollers 432 simply permit the slide-out room 412 to move in a generally horizontal direction when moving from the retracted position to the extended position and vice versa. In addition, the rollers 432 support the weight of the slide-out room 12.

Figure 21:
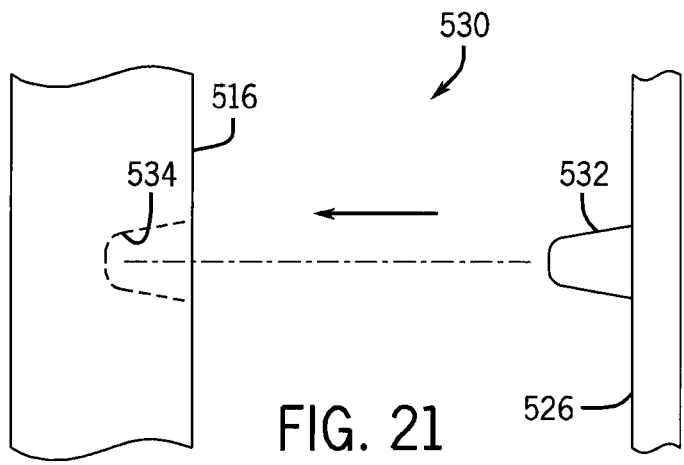
FIG. 21 is a detail side view of the slide-out room in the extended position with the float inhibiting mechanisms disengaged.
Figure 22:
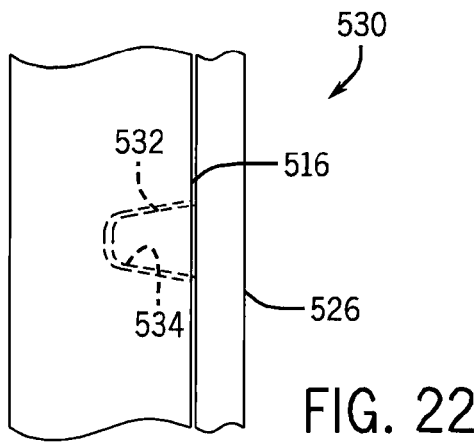
FIG. 22 is a detail side view of the slide-out room in the retracted position with the float inhibiting mechanisms engaged.
Figure 20:
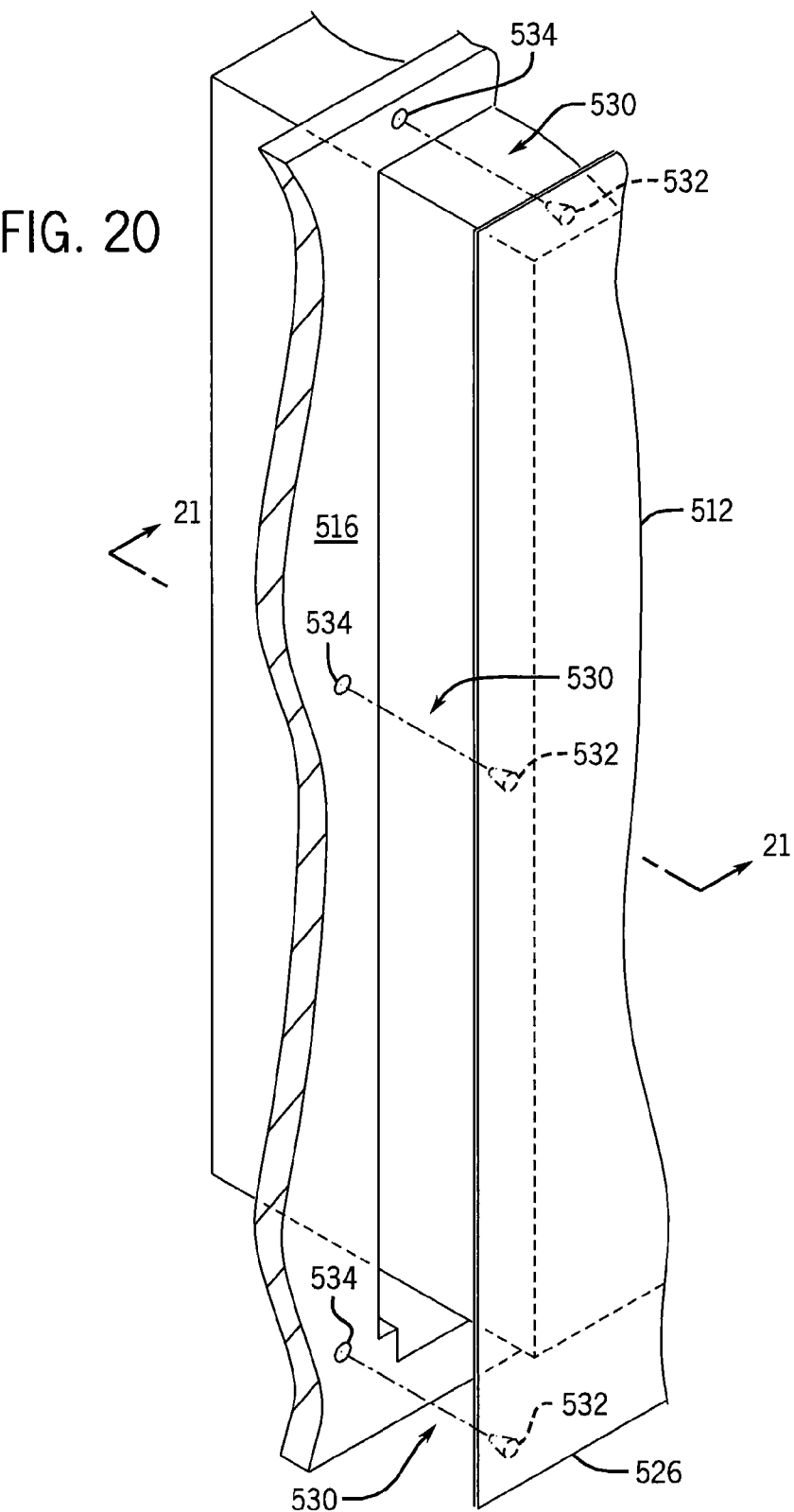
FIG. 20 is a perspective view of the slide-out room system including float inhibiting mechanisms.
Figure 23:
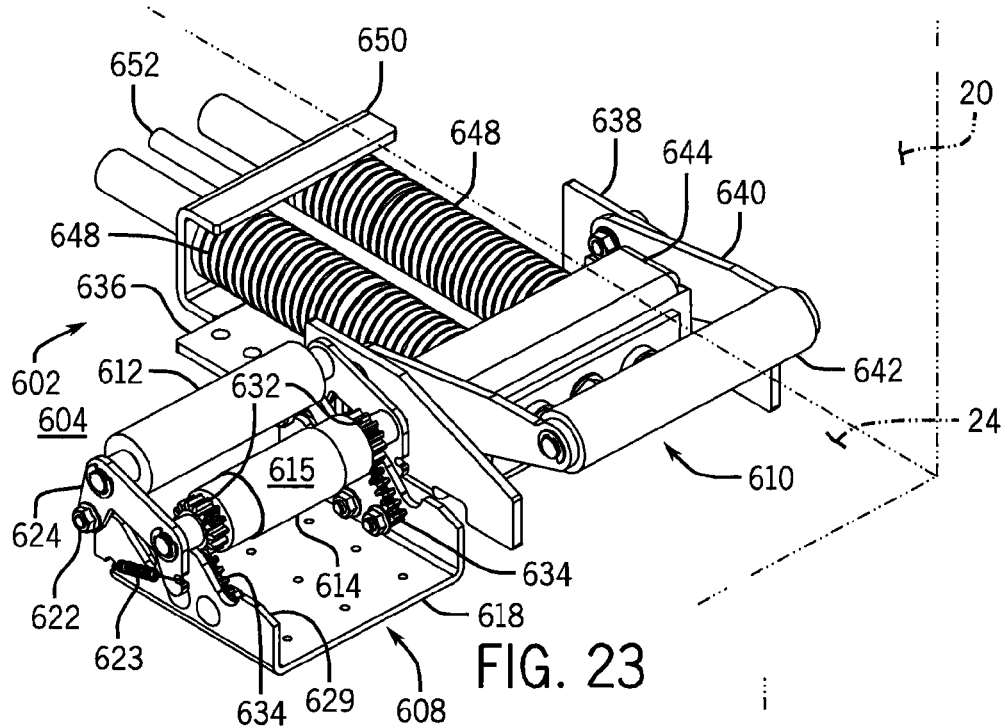
FIG. 23 is a perspective view of another embodiment of a support mechanism supporting the slide-out room of FIG. 1.
Figure 24:
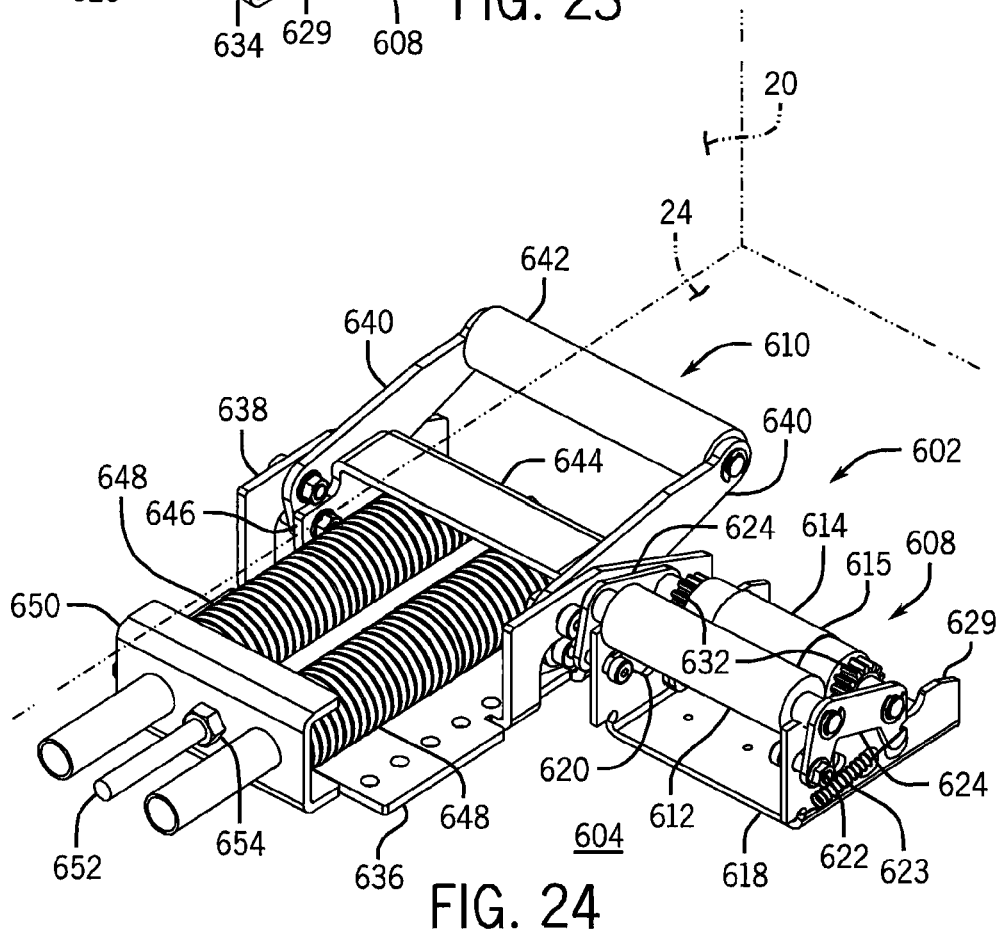
FIG. 24 is another perspective view of the support mechanism of FIG. 23.
Figure 25:
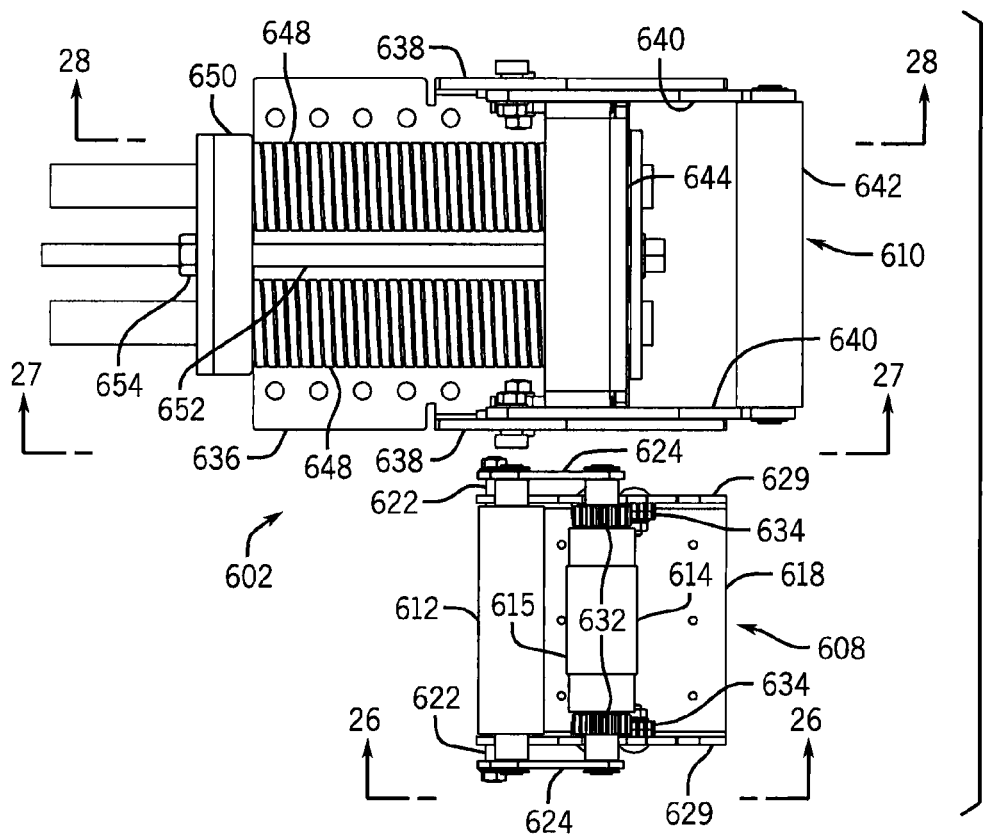
FIG. 25 is a top view of the support mechanism of FIG. 23.

Referring to FIGS. 20-22, any of the above embodiments may further include one or more float inhibiting mechanisms 530 that, as the name implies, inhibit the slide-out room 512 from floating in the transverse direction as the vehicle moves. In the embodiments shown in the figures, the float inhibiting mechanisms 530 each include a frusto-conical shaped post 532 supported by the fascia 526 and facing the side wall 516 of the vehicle. Each post 532 may comprise a resilient material, such as rubber or the like. In the retracted position (FIG. 22), each post 532 is received in a corresponding frusto-conical shaped blind hole 534 defined by the vehicle side wall 516. As such, engagement between the posts 532 and the side wall 516 within the holes 534 inhibits the slide-out room 512 from floating in the transverse direction (i.e., the direction of vehicle movement over the road) as the vehicle moves.

The float inhibiting mechanisms 530 may take other forms and shapes provided that some portion of the mechanism 530 engages or nearly engages the side wall 516 in the retracted position. Alternatively, a positive feature (for example, a post) may be supported by the side wall 516 and a corresponding feature (for example, a hole) may be defined by the fascia 526.

Referring to FIGS. 23-35, another embodiment of a flush floor support mechanism 602 is shown (the vehicle 10 mounts two mechanisms 602, although only one of which is shown). The support mechanisms 602 are disposed between the floor 604 of the vehicle 10 and the floor 24 of the slide-out room 12. The support mechanisms 602 are generally identical except for being disposed in mirrored relation to one another. As such, only one support mechanism 602 will be described below for simplicity.

Generally, the support mechanism 602 includes an elevation assembly 608 that facilitates raising and lowering the slide-out room 12. The support mechanism 602 also includes a biasing assembly 610 that further facilitates raising and lowering the slide-out room 12 and advantageously assists in raising the room 12 when moving from the extended position to the retracted position.

Turning first to the elevation assembly 608 and FIGS. 23-26, this assembly includes a support bracket 618 that is generally U-shaped as viewed in the drive direction, such as a stamped and bent metal bracket. The support bracket 618 also defines guide paths 620 (e.g., j-shaped slots, FIG. 26) that each movably receive a guide pin 622 of a roller linkage 624. This structure ensures the roller linkage 624 maintains its connection to the support bracket 618.

The roller linkage 624 is a generally flat and upside-down u-shaped component, such as a stamped piece of metal. One of the legs mounts the guide pin 622, the intersection between two of the legs pivotally mounts a first elevation roller 612 that engages the slide-out floor 24, and the other intersection between two of the legs pivotally mounts a non-slip second elevation roller 614 that engages the slide-out floor 24. As such, the guide pin 622, the first elevation roller 612, and the second elevation roller 614 remain spaced apart from each other by constant distances as the roller linkage 624 translates relative to the support bracket 618. The leg opposite the guide pin 622 connects to one end of an extension spring 623, and the opposite end of the spring 623 connects to the support bracket 618. As such, the extension spring 623 biases the linkage 624 and the rollers 612 and 614 toward the configuration shown in full lines in FIG. 26.

Figure 26:
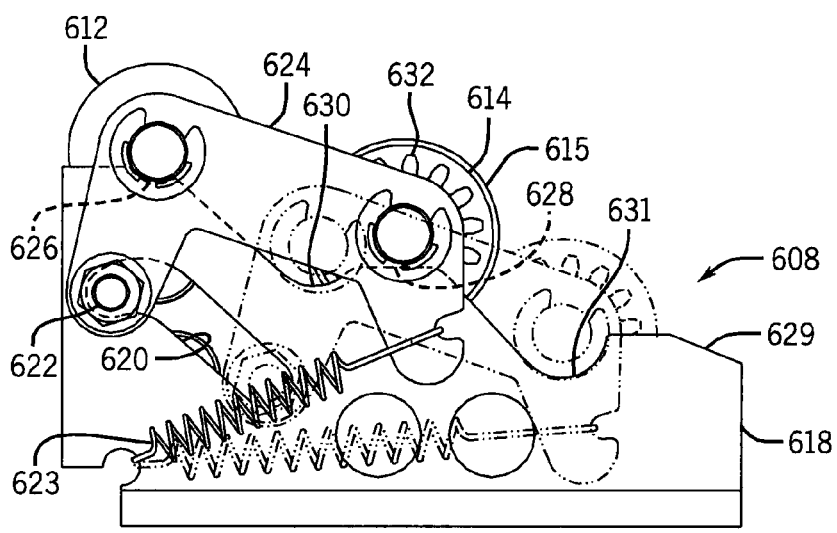
FIG. 26 is a side view of an elevation assembly of the support mechanism along line 26-26 of FIG. 25 in the slide-out room's retracted position; the elevation assembly is shown in phantom in the slide-out room's extended position.
Figure 27:
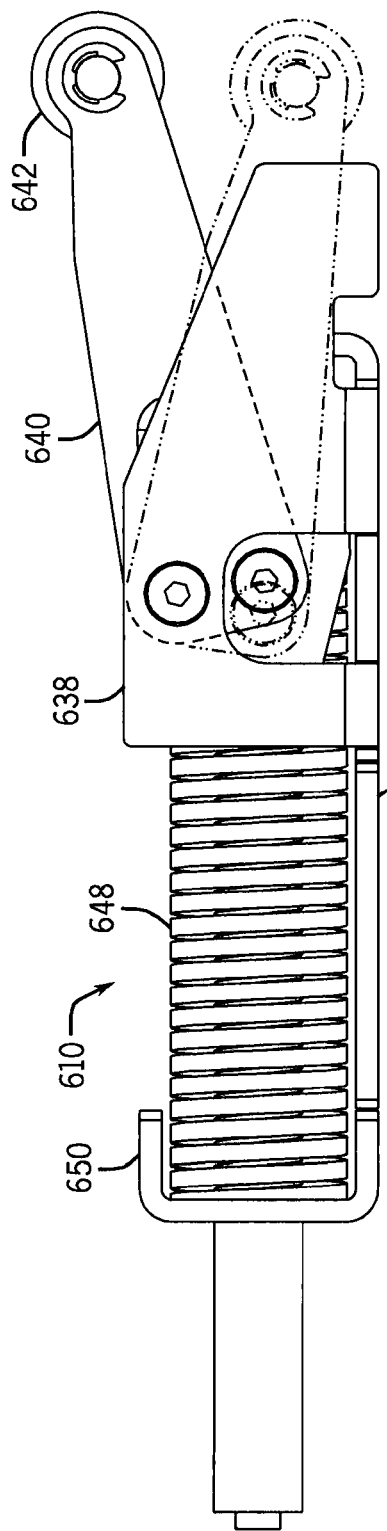
FIG. 27 is a side view of a biasing assembly of the support mechanism along line 27-27 of FIG. 25 in the slide-out room's retracted position; the biasing assembly is shown in phantom in the slide-out room's extended position.
Figure 28:
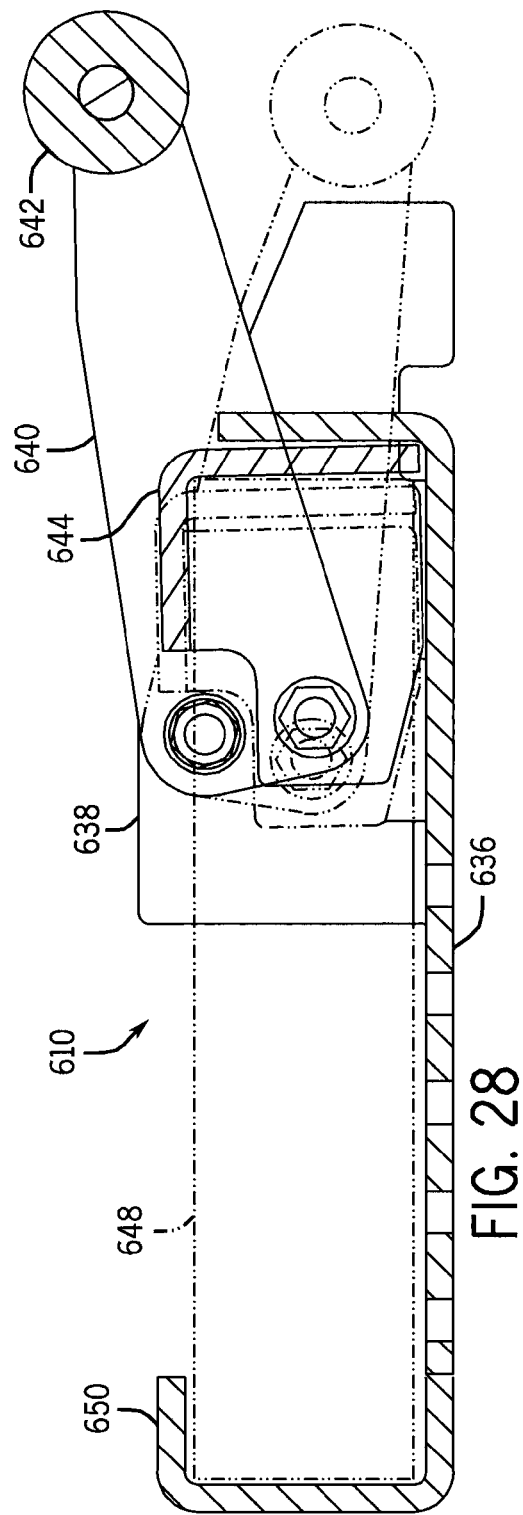
FIG. 28 is a section view of the biasing assembly along line 28-28 of FIG. 25 in the slide-out room's retracted position; the biasing assembly is shown in phantom in the slide-out room's extended position.
Figure 29:
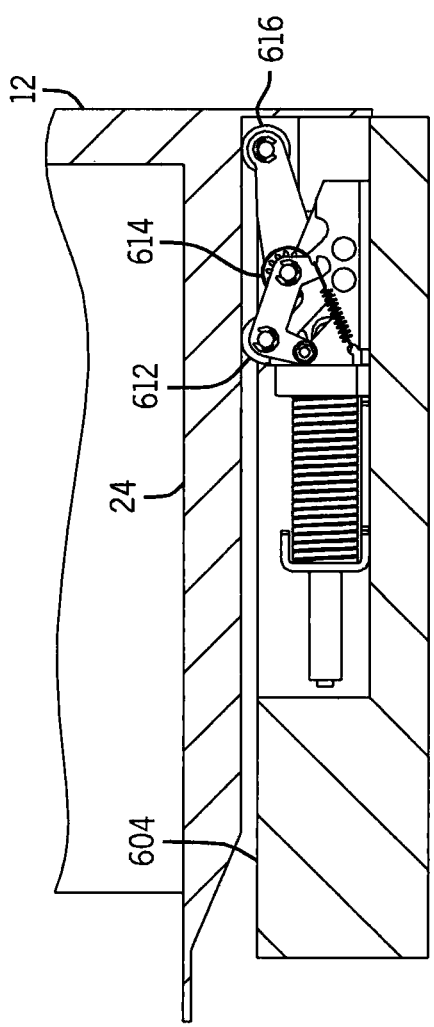
FIG. 29 is a section view of the slide-out room in the retracted position.

As shown in FIG. 26, the roller linkage 624 moves between the position shown in full lines in the slide-out room's retracted position and the position shown in phantom lines in the slide-out room's extended position. In the retracted position, the pins mounting the rollers 612 and 614 are supported at stable locations 626 and 628, respectively, defined by the walls 629 of the support bracket 618. As such, and also due to the shape of the guide paths 620, the rollers 612 and 614 do not move downwardly under the weight of the slide-out room 12 in the retracted position. Similarly, in the extended position, the roller pins are supported at stable locations 630 and 631, respectively, defined by the walls 629 of the support bracket 618. As such, the rollers 612 and 614 do not move downwardly under the weight of the slide-out room 12 in the extended position.

Movement of the roller linkage 624 and the rollers 612 and 614 is guided a guide assembly of the elevation assembly 608. Pinions 632 of this assembly are fixedly mounted to the second elevation roller 614. As such, as the second elevation roller 614 rotates, the pinions 632 rotate and translate along guide members or racks 634 supported by the support bracket 618 and extending at an acute angle to the drive direction. The interaction of these components and the motion of the roller linkage 624, the rollers 612 and 614, and the pinions 632 will be described in further detail below.

To ensure the second roller 614 rotates and translates along the gear rack 634 as the slide-out room 12 engages and moves thereover (i.e., to prevent the slide-out room 12 from slipping on the second roller 614), the second roller 614 may be a non-slip or relatively high friction component. To this end, the second roller 614 may include a relatively high friction cover 615 (e.g., a rubber or sandpaper-like cover). In other embodiments, the lower surface of the floor 24 may support a relatively high friction outer layer.

Turning now to the biasing assembly 610 and FIGS. 23-25, 27, and 28, this assembly includes a support bracket 636 that is generally U-shaped as viewed from the side, such as a stamped and bent metal bracket. However, the support bracket 636 also includes side walls 638 that pivotally support several components. In particular, each side wall 638 pivotally supports a roller bracket 640, which are flat and elongated components, such as stamped pieces of metal. Opposite their pivotal connection to the side walls 638, the roller brackets 640 together rotatably mount a floor-engaging biasing roller 642.

The roller brackets 640 also pivotally support a biasing bracket 644 connected therebetween. The biasing bracket 644 is generally right angle-shaped as viewed from the side except for side walls 646 (FIG. 24) that connect to the roller brackets 640. As such, the biasing bracket 644 may be a stamped and bent metal bracket.

The biasing bracket 644 engages ends of compression springs 648. The other ends of the compression springs 648 engage a rear wall 650 of the support bracket 636. As such, the compression springs 648 are compressed between the rear wall 650 and the biasing bracket 644. This urges the biasing bracket 644 outwardly in the travel direction, which in turn urges the biasing roller 642 generally upwardly in the elevation direction. As described in further detail below, the biasing roller 642 thereby biases the slide-out room 12 upwardly in the elevation direction.

The biasing assembly 610 further includes a threaded screw 652 extending between the support bracket 636 and the biasing bracket 644. A threaded nut 654 connects to the threaded screw 652 on the outside of the rear wall 650 to limit the maximum distance between the rear wall 650 and the biasing bracket 644. This essentially provides a "stop" that defines the position to which the roller brackets 640 and the biasing roller 642 are biased.

Figure 30:
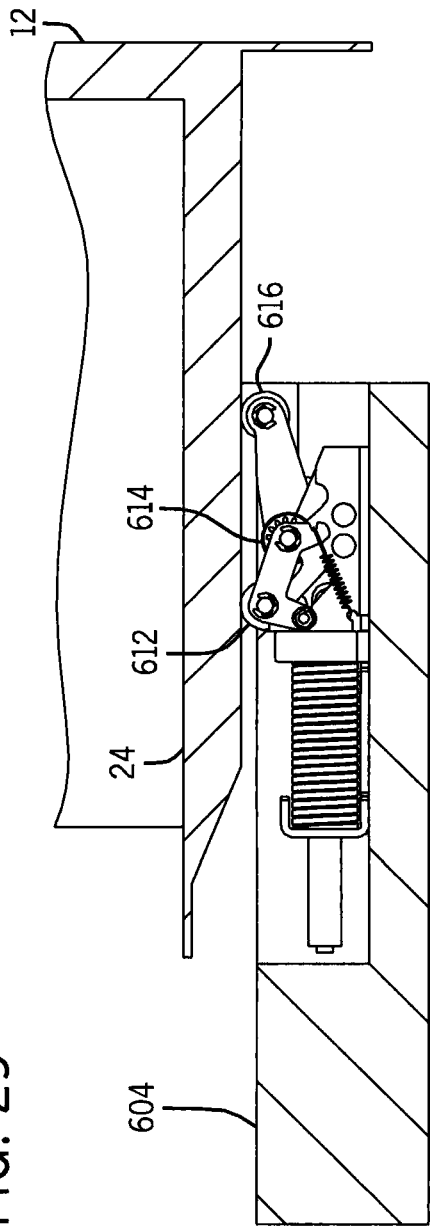
FIG. 30 is a section view of the slide-out room moving toward the extended position.
Figure 31:
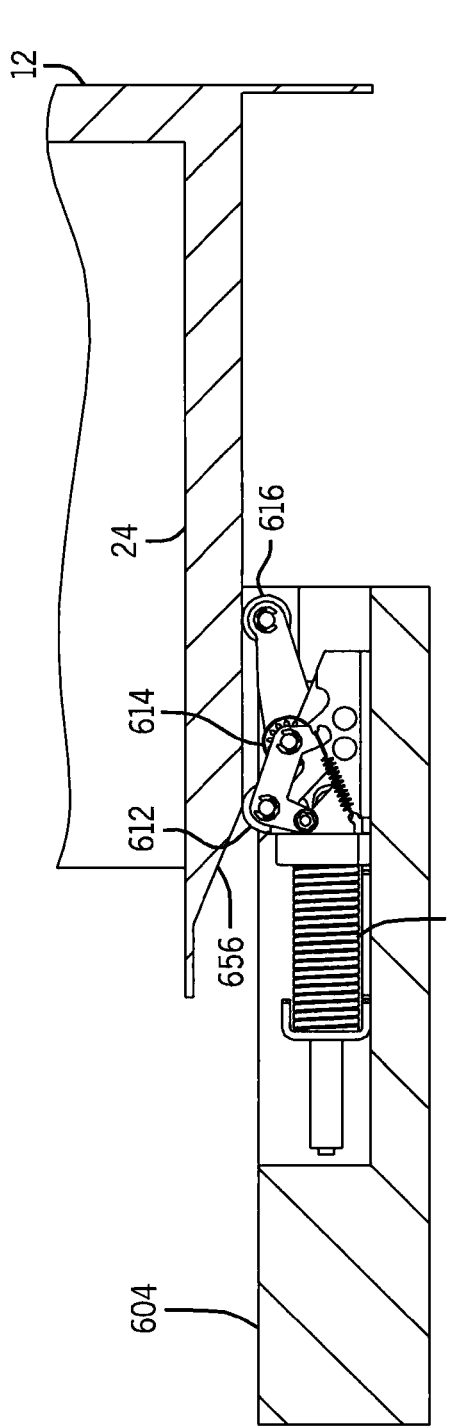
FIG. 31 is another section view of the slide-out room moving toward the extended position.

The support mechanism 602 generally causes the room 12 to descend when moving to the extended position as follows. The first elevation roller 612, the second elevation roller 614, and the biasing roller 616 are disposed in the positions shown in FIGS. 26-27 when the slide-out room 12 is in the retracted position (FIG. 29) and over most of the range of motion apart from the extended position (FIG. 30). That is, the first elevation roller 612 and the biasing roller 616 support the room 12 and the second elevation roller 614 does not. When the slide-out room 12 approaches the extended position (FIG. 31), the first elevation roller 612 engages an inclined lower surface 656 of the slide-out room 12 that is disposed at an acute angle to the drive direction. As the first elevation roller 612 continues to rotate and pass over the inclined lower surface 656, the slide-out room 12 begins to descend. The slide-out room 12 descends instead of tipping backwards because the pinions 50 and 94 are driven at the same speed, and therefore the ceiling 22 and the floor 24 of the slide-out room 12 are driven at the same speed. Furthermore, the biasing roller 616 descends as the room 12 descends, and the compression springs 648 are thereby loaded.

Figure 32:
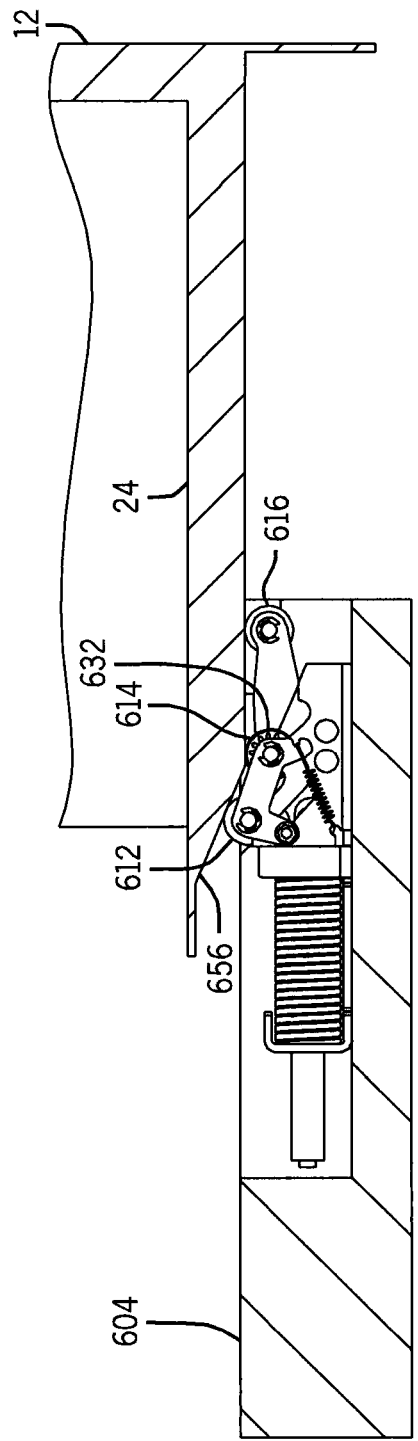
FIG. 32 is another section view of the slide-out room moving toward the extended position.
Figure 33:
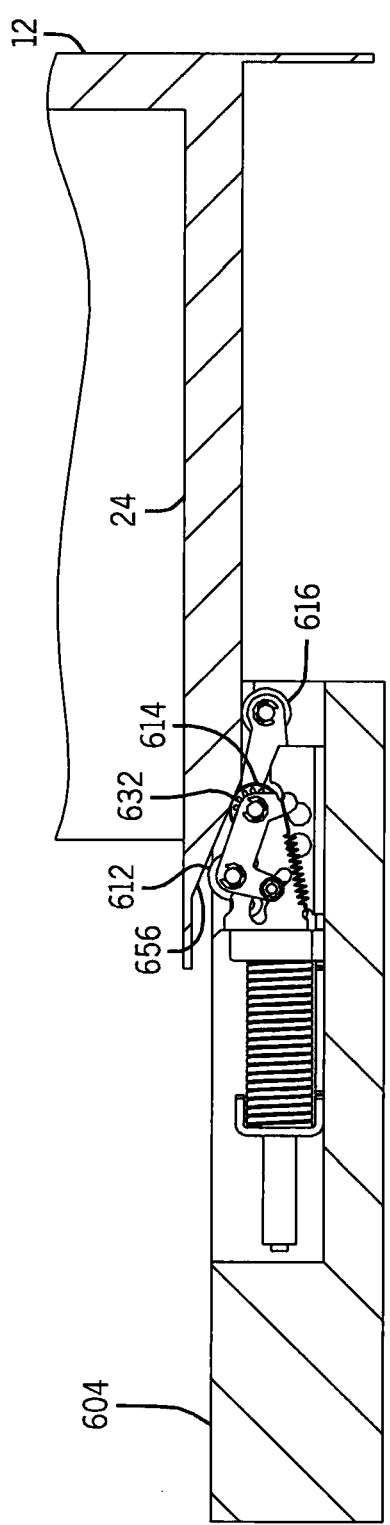
FIG. 33 is another section view of the slide-out room moving toward the extended position.
Figure 34:
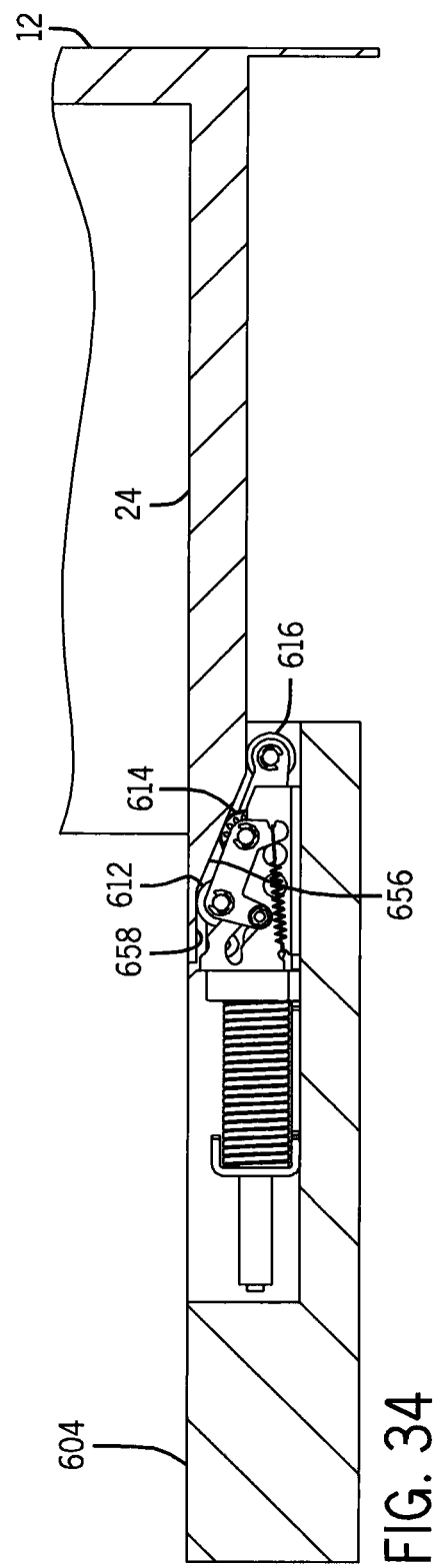
FIG. 34 is another section view of the slide-out room moving toward the extended position.
Figure 35:
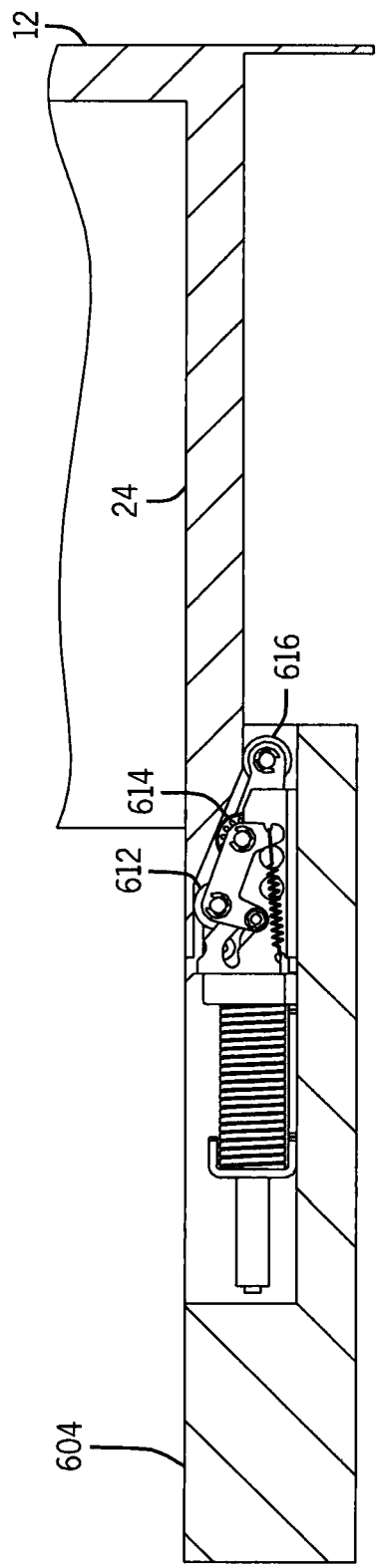
FIG. 35 is a section view of the slide-out room in the extended position.

Eventually the slide-out room 12 descends a sufficient distance such that the floor 24 engages the second elevation roller 614 (FIG. 32). As the room 12 continues to extend and rotates the second elevation roller 614, the pinions 632 rotate and traverse along the racks 634 (FIG. 33). The second elevation roller 614 moves together with the pinions 632, and the first elevation roller 614 follows the second elevation roller 614 due to their connection to the roller linkage 624. The first elevation roller 612 then engages a horizontal surface 658 adjacent the inclined surface 656 (FIG. 34), and the slide-out room 12 stops descending. Finally, the slide-out room 12 moves horizontally to disengage the second elevation roller 614 from the floor 24 and reach the extended position (FIG. 35).

To return the slide-out room 12 to the retracted position, the room 12 and the support mechanism 602 generally move in the opposite manner. However, it should be apparent that the springs 648 are more compressed in the extended position than the retracted position, and the springs 648 thereby urge the biasing roller 616 upwardly to provide an assist for lifting the slide-out room 12. As such, the prime movers 34 advantageously do not need to be capable of providing sufficient power to lift the slide-out room 12 on their own.

Referring to FIGS. 36-39, another embodiment of a flush floor support mechanism 702 is shown (the vehicle 10 mounts two mechanisms 702, although only one of which is shown). The support mechanisms 702 are disposed between the floor of the vehicle and the floor of the slide-out room. The support mechanisms 702 are generally identical except for possibly being disposed in mirrored relation to one another. As such, only one support mechanism 702 will be described below for simplicity.

The support mechanism 702 includes a roller 704 that is moved in the elevation direction to move the slide-out room in the elevation direction. The roller 704 is moved via an elevating mechanism that includes a prime mover (not shown), such as a DC motor connected to a speed-reducing gearbox. The prime mover drives a threaded shaft 706 that in turn translatably drives a first support block 708 along a base 710 (see FIGS. 36 and 38).

The first support block 708 pivotally mounts first links 712 that pivotally connect to a roller mounting bracket 714 opposite the first support block 708. Adjacent the first links 712, the roller mounting bracket 714 also pivotally connects to second links 716. The second links 716 also connect to a second support block 718 translatably mounted to the base 710. As shown in the figures, the threaded shaft 706 may extend through the second support block 718, although the shaft 706 does not directly drive the second support block 718.

Figure 36:
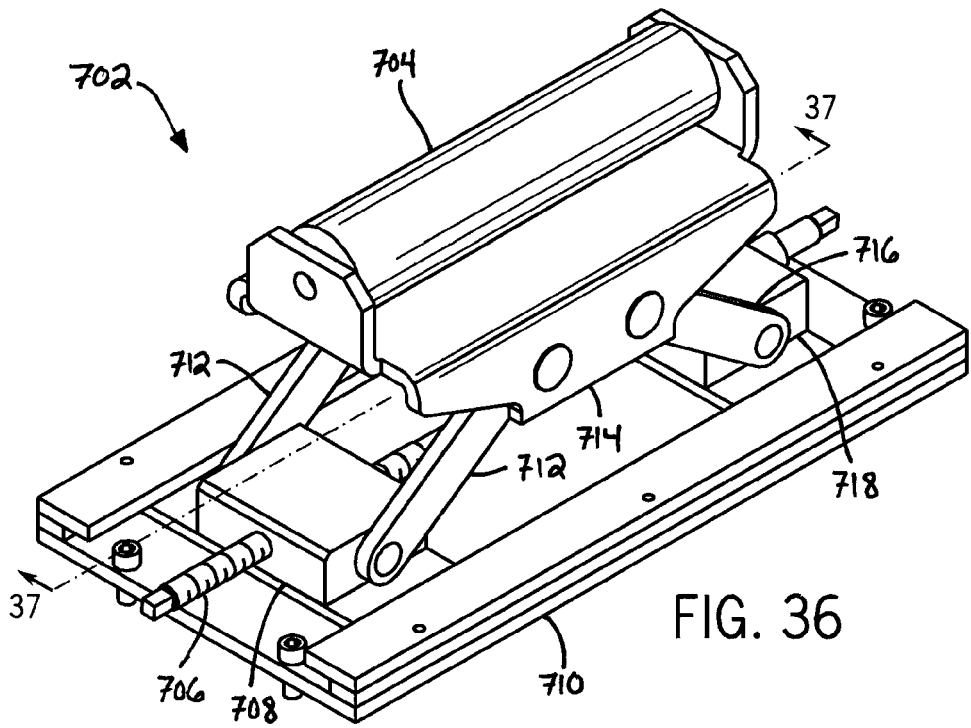
FIG. 36 is a perspective view of another embodiment of a support mechanism supporting the slide-out room of FIG. 1 in an elevated position.
Figure 37:
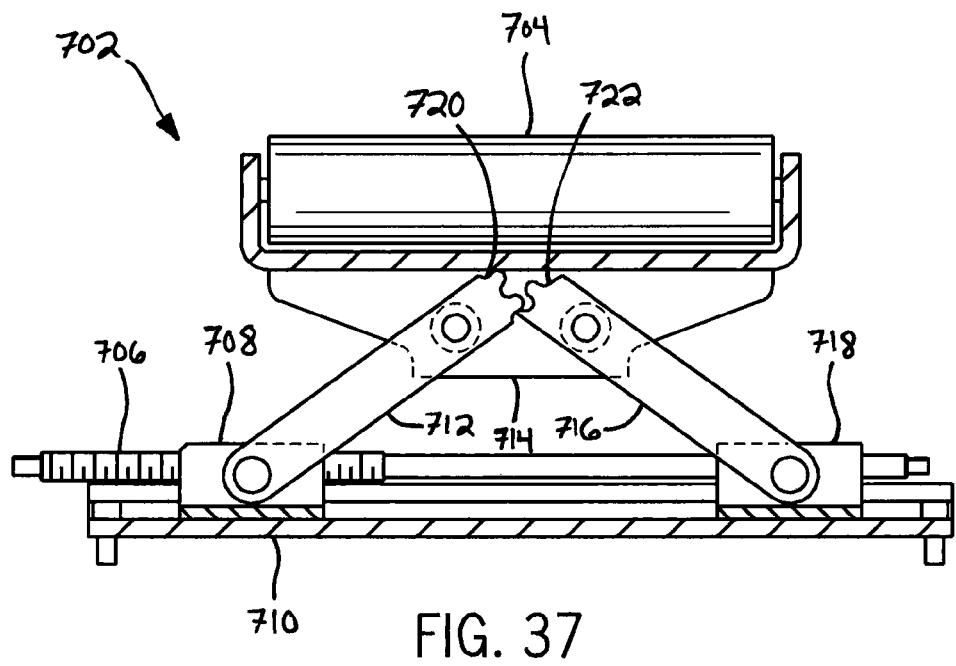
FIG. 37 is a side view of the support mechanism along line 37-37 of FIG. 36.
Figure 38:
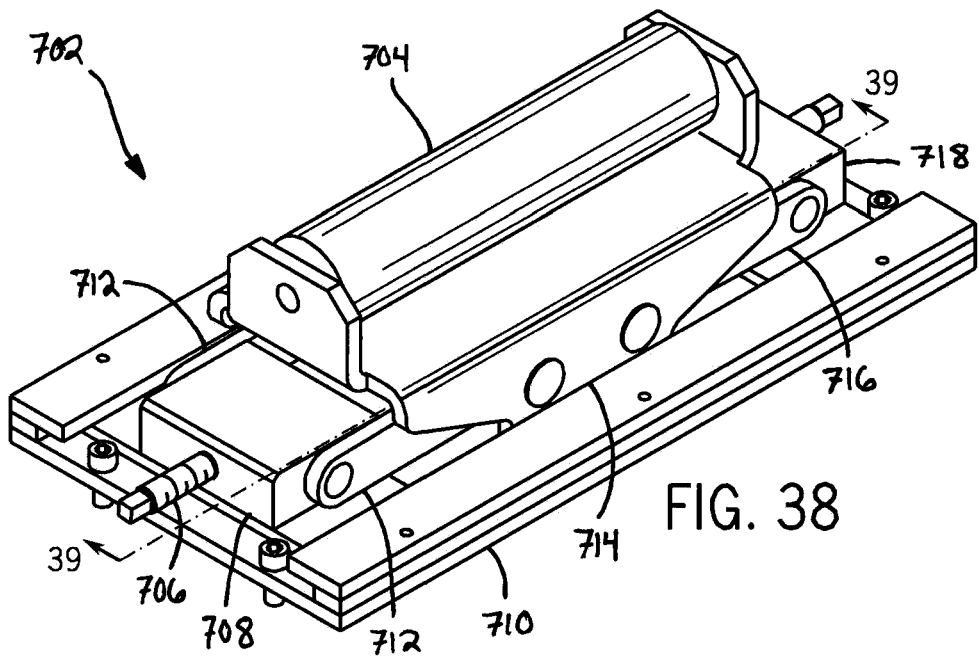
FIG. 38 is a perspective view of the support mechanism of FIG. 36 in a lowered position.
Figure 39:
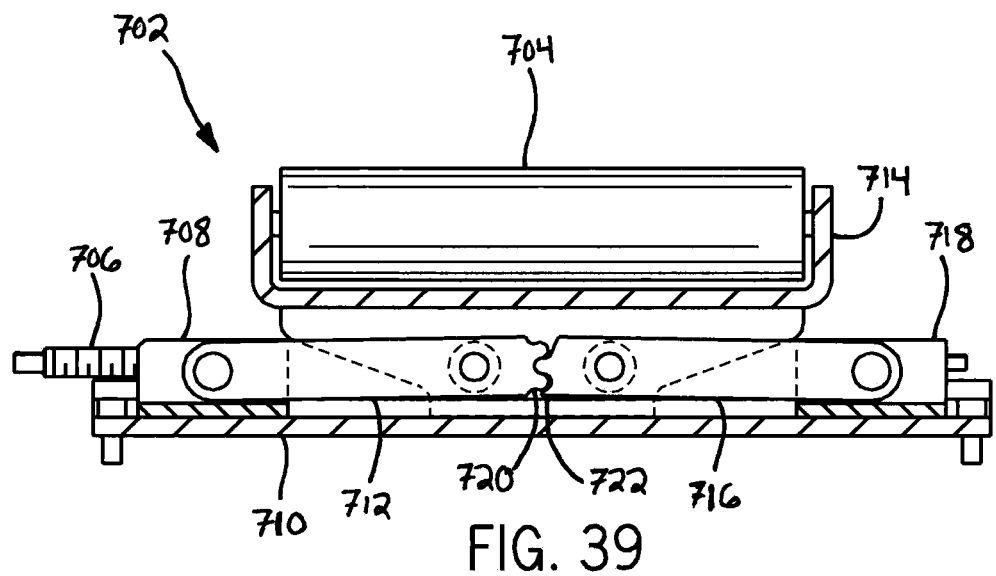
FIG. 39 is a side view of the support mechanism along line 39-39 of FIG. 38.

The ends of the first links 712 proximate the roller mounting bracket 714 include first gear tooth surfaces 720 (FIGS. 37 and 39). These surfaces 720 drivingly engage second gear tooth surfaces 722 at the ends of the second links 716 proximate the roller mounting bracket 714. Thus, engagement of the gear tooth surfaces 720, 722 cause the links 712, 716 to pivot and the support blocks 708, 718 to translate in coordinated manners. That is and as shown in FIGS. 38 and 39, as the threaded shaft 706 rotates in one direction, the support blocks 708, 718 move apart and the links 712, 716 pivot downwardly to lower the roller 704 and the slide-out room in the elevation direction. Conversely and as shown in FIGS. 36 and 37, as the threaded shaft 706 rotates in the opposite direction, the support blocks 708, 718 move toward each other and the links 712, 716 pivot upwardly to raise the roller 704 and the slide-out room in the elevation direction.

The support mechanism 702 is relatively stable compared to other similar mechanisms that do not include gear tooth surfaces (i.e., those in which the second support block 718 is fixed relative to the base 710).

Referring to FIGS. 40-43, another embodiment of a flush floor support mechanism 802 is shown (the vehicle 10 mounts two mechanisms 802, although only one of which is shown). The support mechanisms 802 are disposed between the floor of the vehicle and the floor of the slide-out room. The support mechanisms 802 are generally identical except for possibly being disposed in mirrored relation to one another. As such, only one support mechanism 802 will be described below for simplicity.

The support mechanism 802 includes a roller 804 that is moved in the elevation direction to move the slide-out room in the elevation direction. The roller 804 is moved via an elevating mechanism that includes a prime mover (not shown), such as a DC motor connected to a speed-reducing gearbox. The prime mover drives a threaded shaft 806 that in turn translatably drives a first support block 808 along a base 810 (see FIGS. 41 and 43).

Figure 41:
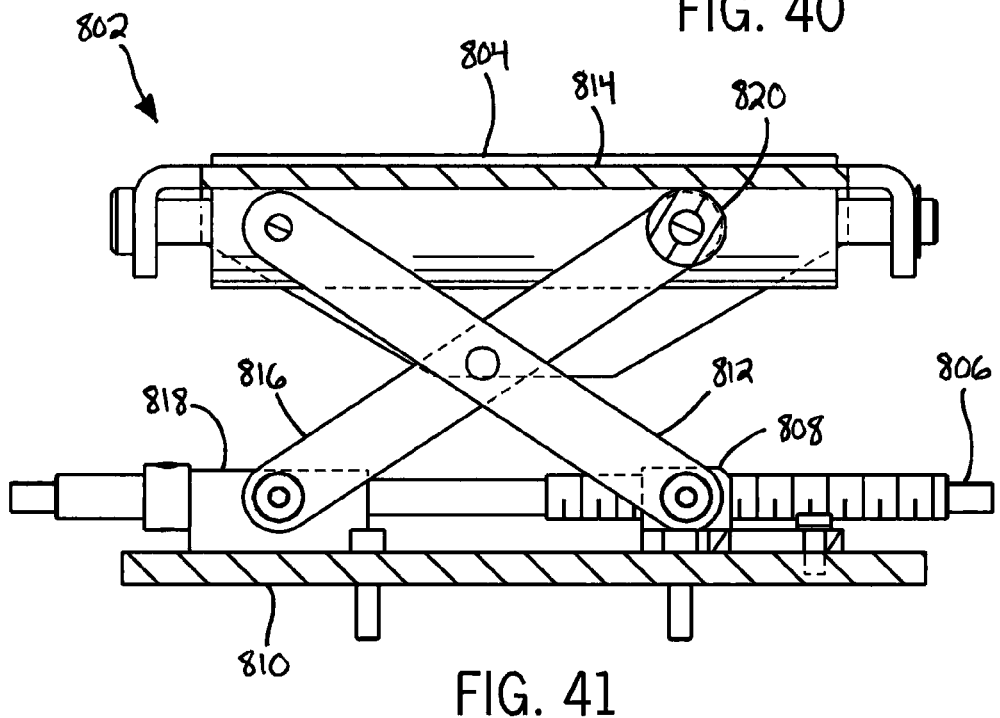
FIG. 41 is a side view of the support mechanism along line 41-41 of FIG. 40.

The first support block 808 pivotally mounts first links 812 that pivotally connect to a roller mounting bracket 814 opposite the first support block 808. Between their connection points to the first support block 808 and the roller mounting bracket 814, the first links 812 also pivotally connect to second links 816. At a first end, the second links 816 connect to a second support block 818 fixed to the base 810. As shown in the figures, the threaded shaft 806 may extend through and be rotatably supported by the second support block 818. At a second end, the second links 816 rotatably mount wheels 820 (one of which is shown in FIGS. 41 and 43) that engage a lower surface of the roller mounting bracket 814.

Figure 40:
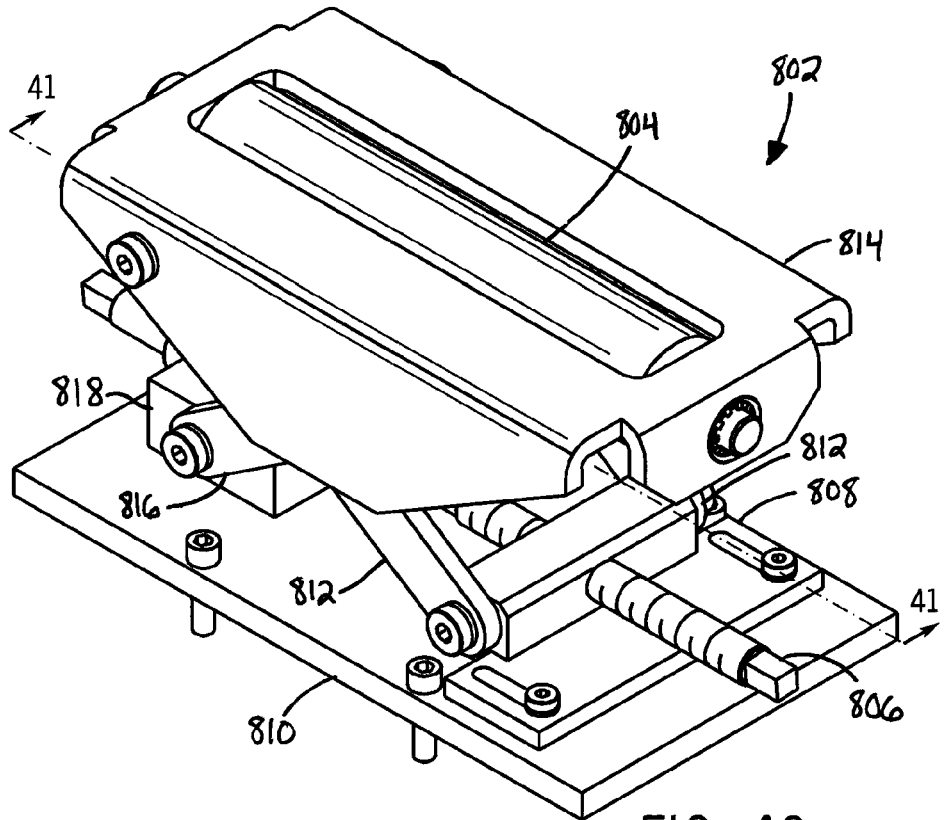
FIG. 40 is a perspective view of another embodiment of a support mechanism supporting the slide-out room of FIG. 1 in an elevated position.
Figure 42:
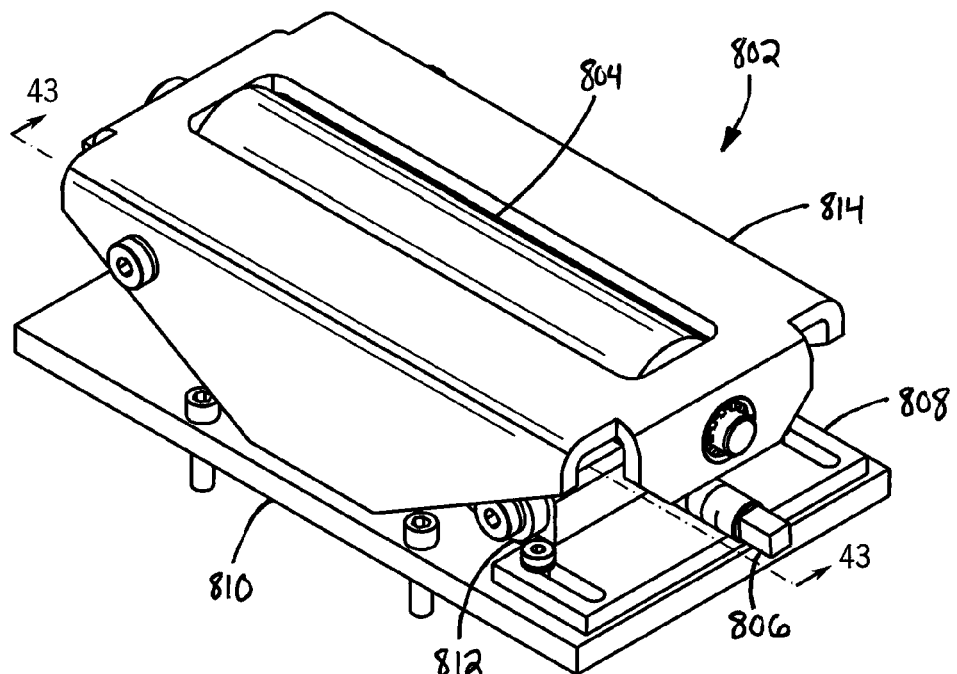
FIG. 42 is a perspective view of the support mechanism of FIG. 40 in a lowered position.
Figure 43:
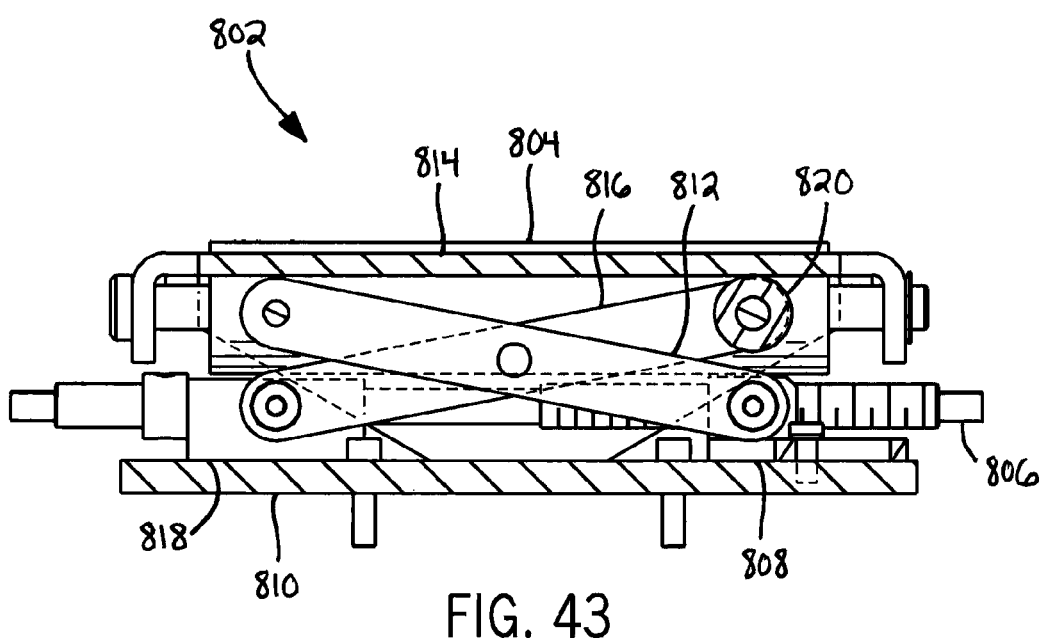
FIG. 43 is a side view of the support mechanism along line 43-43 of FIG. 42.

As shown in FIGS. 42 and 43, as the threaded shaft 806 rotates in one direction, the first support block 808 moves away from the second support block 818 and the links 812, 816 pivot toward a horizontal configuration to lower the roller 804 and the slide-out room in the elevation direction. Conversely and as shown in FIGS. 40 and 41, as the threaded shaft 806 rotates in the opposite direction, the first support block 808 moves toward the second support block 818 and the links 812, 816 pivot toward a vertical configuration to raise the roller 804 and the slide-out room in the elevation direction.

The slide-out system may also be modified in other manners that are not explicitly described herein. For example, instead of including float inhibiting mechanisms, the prime mover may be sufficiently powerful to firmly compress the seals in the retracted position and inhibit the slide-out room from floating in the transverse direction due to friction forces between the seals and the vehicle wall alone. Whether float inhibiting mechanisms are used or not in combination with the seals, it might be advantageous to apply a brake to the mechanism, preferably acting on the motor output shaft so the brake has the benefit of the gear reduction drive train to keep the room stationary. The brake would come on when the motor was turned off, to keep the seals compressed, and if a float inhibiting mechanism is used, to keep it engaged.

From the above, it should be apparent that the slide-out system according to the present invention provides a transversely floating drive mechanism that facilitates use of components or features that inhibit the slide-out room from shifting as the vehicle moves. Furthermore, in some embodiments, these mechanisms do not support the weight of the slide-out room and are configured to move or float vertically relative to the vehicle. This motion permits the slide-out room to descend near the extended position and act as a flush floor slide-out room.

It is specifically intended that the present invention not be limited to the embodiments and illustrations contained herein, but include modified forms of those embodiments including portions of the embodiments and combinations of elements of different embodiments as defined within the scope of the following claims.

What is claimed is:

1. An apparatus for moving a slide-out room disposed in an aperture of a side wall of a vehicle from a retracted position to an extended position in a drive direction of the slide-out room, the apparatus comprising:
   a drive assembly supported by the side wall of the vehicle at one side of the aperture, the drive assembly including a prime mover having a brake engagable to inhibit unintentional movement of the slide-out room; and
   a driven assembly driven by the drive assembly, the driven assembly being connected to a wall of the slide-out room at a side of the slide-out room adjacent said one side of the aperture such that the slide-out room moves with the driven assembly from the retracted position to the extended position in the drive direction of the slide-out room;
   wherein the drive assembly includes a rotatable pinion driven by the prime mover and the driven assembly includes a rack driven by the pinion and the drive assembly includes a drive support rotatably supporting the pinion, and the drive support engages the rack to inhibit the rack from disengaging the pinion.

2. The apparatus of claim 1, wherein the brake is a dynamic brake that is automatically engaged when the prime mover is de-energized.

3. The apparatus of claim 2, wherein the prime mover further includes a rotary encoder.

4. The apparatus of claim 1, further comprising a second drive assembly supported by the side wall of the vehicle at a side of the aperture opposite from said one side, the second drive assembly including a prime mover having a brake engagable to inhibit unintentional movement of the slide-out room at said opposite side of the aperture; and
   a second driven assembly driven by the second drive assembly, the second driven assembly being connected to a wall of the slide-out room at a side of the slide-out room adjacent said opposite side of the aperture such that the slide-out room moves with the driven assembly from the retracted position to the extended position in the drive direction of the slide-out room.

5. An apparatus for moving a slide-out room disposed in an aperture of a side wall of a vehicle from a retracted position to an extended position in a drive direction of the slide-out room, the apparatus comprising:
   a drive assembly supported by the side wall of the vehicle, the drive assembly including a drive support that engages the driven assembly to inhibit the driven assembly from disengaging the drive assembly and a prime mover having a dynamic brake that is automatically engagable when the prime mover is de-energized; and
   a driven assembly driven by the drive assembly, the driven assembly being connected to a wall of the slide-out room such that 1) the slide-out room moves with the driven assembly from the retracted position to the extended position in the drive direction of the slide-out room, and 2) the driven assembly is movable in a transverse direction generally perpendicular to the drive direction of the slide-out room relative to the wall of the slide-out room.

6. The apparatus of claim 5, wherein the prime mover further includes a rotary encoder.

7. The apparatus of claim 5, wherein the drive assembly includes a rotatable pinion driven by the prime mover and the driven assembly includes a rack driven by the pinion.

8. An apparatus for moving a slide-out room disposed in an aperture of a side wall of a vehicle from a retracted position to an extended position in a drive direction of the slide-out room, the apparatus comprising:
   a drive assembly supported by the side wall of the vehicle, the drive assembly including a prime mover having a dynamic brake being automatically engagable when the prime mover is de-energized; and
   a driven assembly driven by the drive assembly, the driven assembly being connected to a wall of the slide-out room such that 1) the slide-out room moves with the driven assembly from the retracted position to the extended position in the drive direction of the slide-out room, and 2) the driven assembly is movable in a transverse direction generally perpendicular to the drive direction of the slide-out room relative to the wall of the slide-out room;
   wherein the drive assembly includes a rotatable pinion driven by the prime mover and the driven assembly includes a rack driven by the pinion;
   wherein the drive assembly includes a drive support rotatably supporting the pinion, and the drive support engages the rack to inhibit the rack from disengaging the pinion.

9. An apparatus for moving a slide-out room disposed in an aperture of a side wall of a vehicle from a retracted position to an extended position in a drive direction of the slide-out room, the apparatus comprising:
   a drive assembly supported by the side wall of the vehicle, the drive assembly including a prime mover having a dynamic brake being automatically engagable when the prime mover is de-energized; and
   a driven assembly driven by the drive assembly, the driven assembly being connected to a wall of the slide-out room such that 1) the slide-out room moves with the driven assembly from the retracted position to the extended position in the drive direction of the slide-out room, and 2) the driven assembly is movable in a transverse direction generally perpendicular to the drive direction of the slide-out room relative to the wall of the slide-out room;
   wherein the drive assembly includes a rotatable pinion driven by the prime mover and the driven assembly includes a rack driven by the pinion; and
   wherein the driven assembly further includes:
   a room engaging bracket connected to the slide-out room; and
   a pin-in-slot connection connecting the rack and the room engaging bracket, the pin-in-slot connection including:
   a slot elongated in the transverse direction;
   a pin received in the slot, the pin being movable in the transverse direction in the slot to permit the rack to move in the transverse direction as the slide-out room moves in the drive direction of the slide-out room.

10. The apparatus of claim 9, wherein the pin extends in an elevation direction generally perpendicular to the drive direction of the slide-out room and the transverse direction.

11. The apparatus of claim 10, wherein the drive assembly includes a drive support rotatably supporting the pinion, and the drive support engages the rack to inhibit the rack from disengaging the pinion.

12. The apparatus of claim 5, wherein the drive assembly, the driven assembly, and the slide-out room are movable in an elevation direction generally perpendicular to the drive direction of the slide-out room and the transverse direction.

13. An apparatus for moving a slide-out room disposed in an aperture of a side wall of a vehicle from a retracted position to an extended position in a drive direction of the slide-out room, the apparatus comprising:
   a drive assembly supported by the side wall of the vehicle and including:
      a drive support;
      a prime mover supported by the drive support, the prime mover including a brake engagable to inhibit unintentional movement of the slide-out room;
      a pinion rotatably supported by the drive support and driven by the prime mover;
   a driven assembly supported by a wall of the slide-out room and including:
      a room engaging bracket connected to the slide-out room; and
      a rack connected to the room engaging bracket and driven by the pinion such that 1) the slide-out room moves with the rack from the retracted position to the extended position in the drive direction of the slide-out room, and 2) the rack is movable in a transverse direction generally perpendicular to the drive direction of the slide-out room relative to the wall of the slide-out room; and
   wherein the drive support engages the rack to inhibit the rack from disengaging the pinion.

14. The apparatus of claim 13, wherein the brake is a dynamic brake that is automatically engaged when the prime mover is de-energized.

15. The apparatus of claim 14, wherein the prime mover further includes a rotary encoder.

16. The apparatus of claim 13, wherein the driven assembly further includes a pin-in-slot connection connecting the rack and the room engaging bracket, the pin-in-slot connection including:
   a slot elongated in the transverse direction;
   a pin received in the slot, the pin being movable in the transverse direction in the slot to permit the rack to move in the transverse direction as the slide-out room moves in the drive direction.

17. The apparatus of claim 16, wherein the pin extends in an elevation direction generally perpendicular to the drive direction and the transverse direction.

* * * * *